(12) United States Patent
Anazawa et al.

(10) Patent No.: US 12,517,087 B2
(45) Date of Patent: Jan. 6, 2026

(54) CAPILLARY ARRAY

(71) Applicant: HITACHI HIGH-TECH CORPORATION, Tokyo (JP)

(72) Inventors: Takashi Anazawa, Tokyo (JP); Ryoji Inaba, Tokyo (JP); Shuhei Yamamoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 255 days.

(21) Appl. No.: 18/266,924

(22) PCT Filed: Dec. 18, 2020

(86) PCT No.: PCT/JP2020/047369
§ 371 (c)(1),
(2) Date: Jun. 13, 2023

(87) PCT Pub. No.: WO2022/130607
PCT Pub. Date: Jun. 23, 2022

(65) Prior Publication Data
US 2024/0110890 A1    Apr. 4, 2024

(51) Int. Cl.
*G01N 27/447*    (2006.01)
*G01N 21/64*    (2006.01)

(52) U.S. Cl.
CPC ....... *G01N 27/44721* (2013.01); *G01N 21/64* (2013.01); *G01N 27/44782* (2013.01); *G01N 21/6456* (2013.01)

(58) Field of Classification Search
CPC ............. G01N 27/44721; G01N 21/64; G01N 27/44782; G01N 21/6456
See application file for complete search history.

(56) References Cited

U.S. PATENT DOCUMENTS

| | | | | |
|---|---|---|---|---|
| 5,938,908 A | * | 8/1999 | Anazawa | ......... G01N 27/44721 204/603 |
| 2003/0098239 A1 | * | 5/2003 | Anazawa | ......... G01N 27/44782 204/603 |

(Continued)

FOREIGN PATENT DOCUMENTS

| | | |
|---|---|---|
| JP | 3559648 B2 | 9/2004 |
| JP | 3654290 B2 | 6/2005 |
| JP | 5039156 B2 | 10/2012 |

OTHER PUBLICATIONS

Andriy Tsupryk et al., "Novel design of multicapillary arrays for high-throughput DNA sequencing", Electrophoresis 2006, 27, pp. 2869-2879.

(Continued)

*Primary Examiner* — Dominic J Bologna
(74) *Attorney, Agent, or Firm* — MATTINGLY & MALUR, PC

(57) ABSTRACT

A capillary array includes N analysis capillaries filled with a separation medium having a refractive index of $n_3$ and used for electrophoretic analysis and N±1 lens capillaries filled with a medium having a refractive index of n4 and not used for the electrophoretic analysis, in which the N analysis capillaries and the N±1 lens capillaries are alternately arranged on the same array plane. When an outer diameter is defined as 2R, an inner diameter is defined as 2r, a refractive index of a medium of an outside is $n_1$, and a refractive index of a material is defined as $n_2$ for each of the N analysis capillaries and the N±1 lens capillaries, and when a refractive index $n_3$ takes any value within the range of $1.33 \leq n_3 \leq 1.42$, R, r, $n_1$, $n_2$, $n_3$, and $n_4$ satisfy a predetermined relationship, whereby the N analysis capillaries are efficiently simultaneously irradiated with the laser beam incident from a side of the array plane.

22 Claims, 21 Drawing Sheets

(56) References Cited

U.S. PATENT DOCUMENTS

| | | | | |
|---|---|---|---|---|
| 2003/0226756 A1* | 12/2003 | Inaba | ............... | G01N 27/44782 |
| | | | | 204/603 |
| 2005/0231718 A1* | 10/2005 | Goodall | ................ | G01N 21/05 |
| | | | | 356/344 |
| 2011/0068007 A1* | 3/2011 | Pang | ................ | G01N 27/44721 |
| | | | | 204/603 |
| 2022/0229013 A1* | 7/2022 | Sumida | .............. | G01N 21/6428 |
| 2022/0334055 A1* | 10/2022 | Wang | ................ | G01N 21/6452 |

OTHER PUBLICATIONS

International Search Report of PCT/JP2020/047369 dated Mar. 16, 2021.

* cited by examiner

FIG. 5
(a)
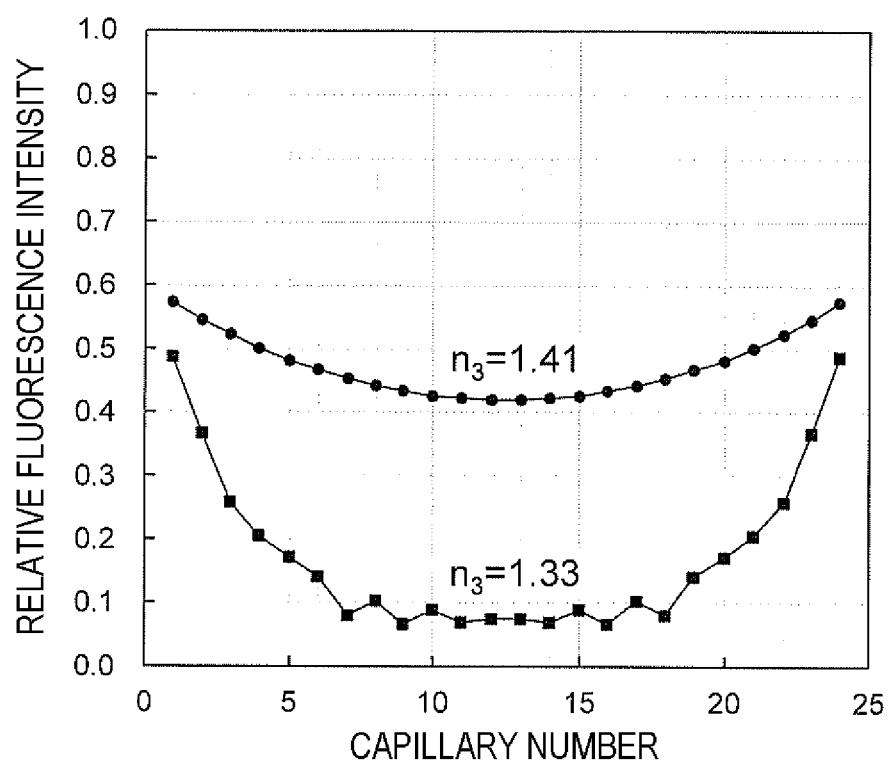
(b)
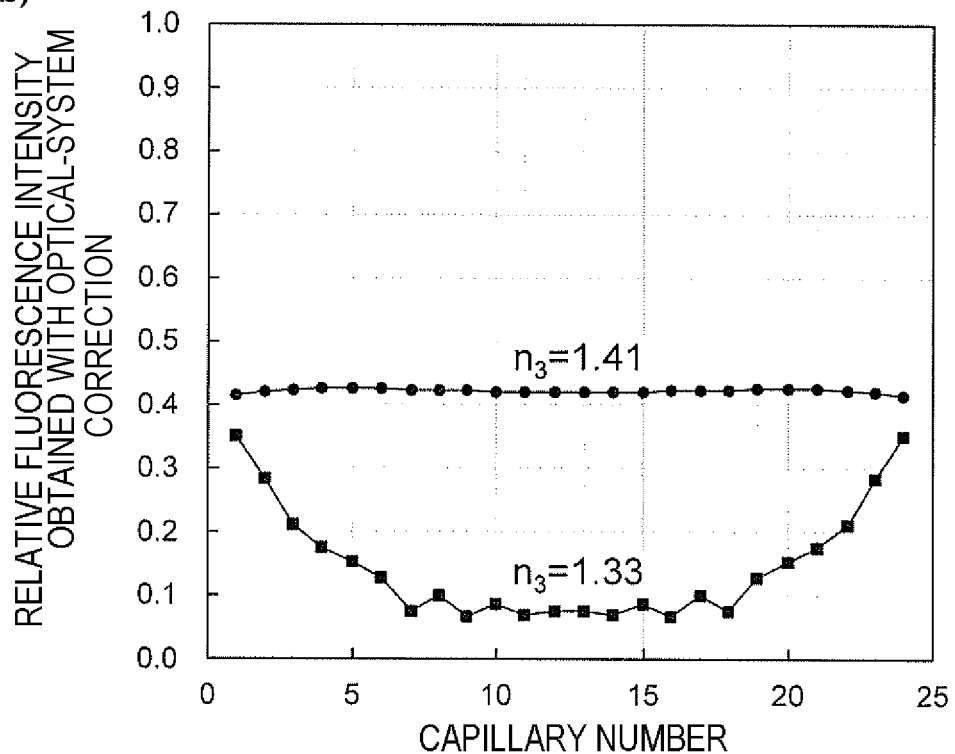

*FIG. 7*
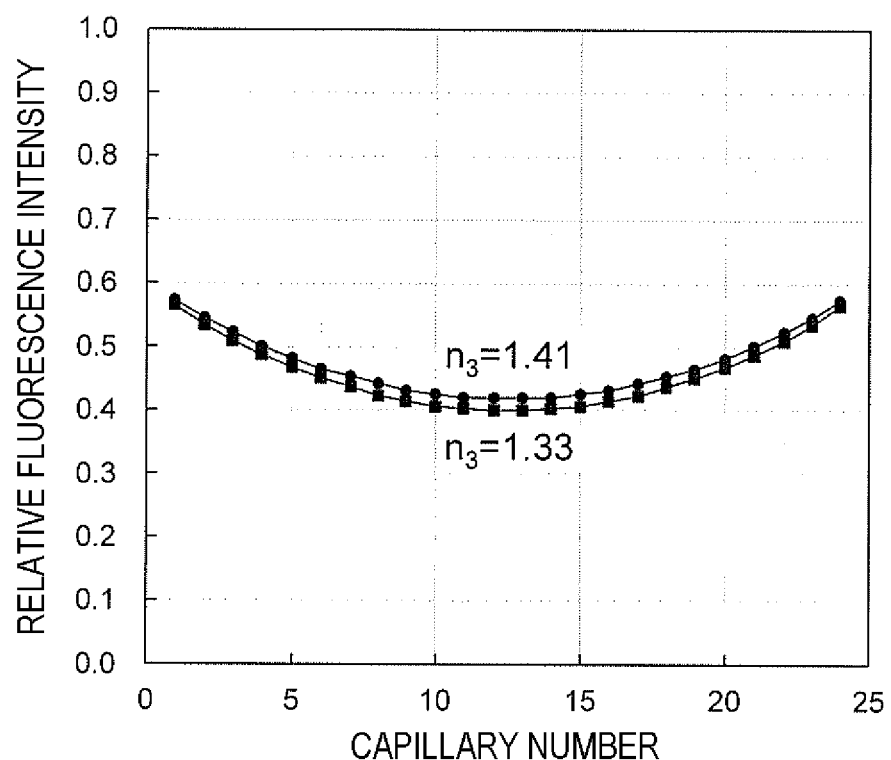
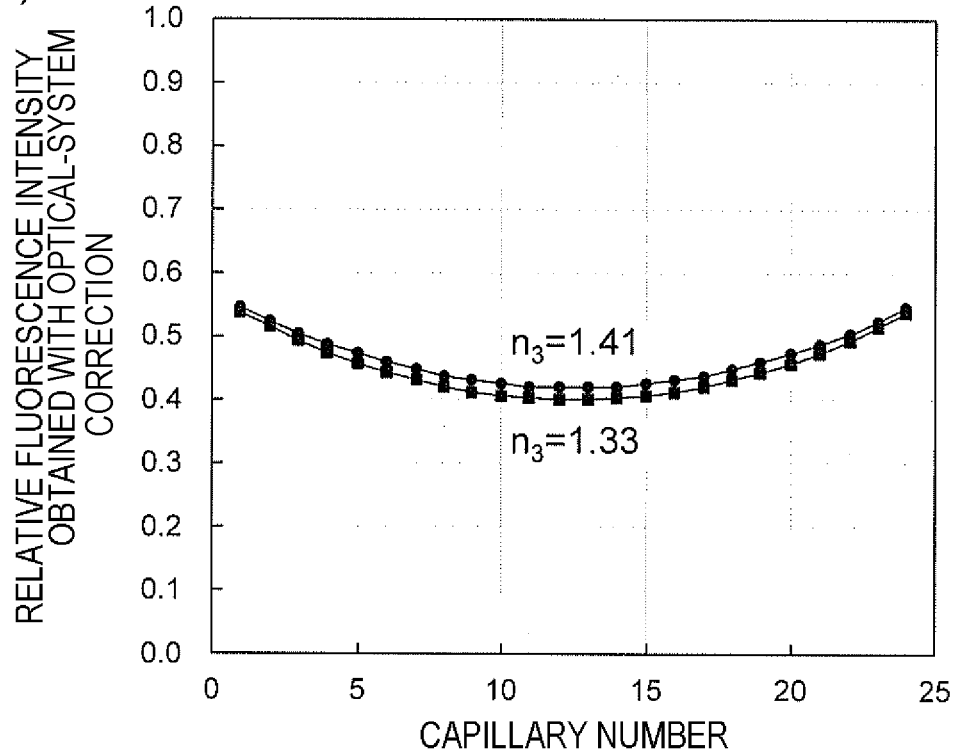

$n_1 = 1.25$ $n_1 = 1.25$
$n_3 = 1.33$

FIG. 21
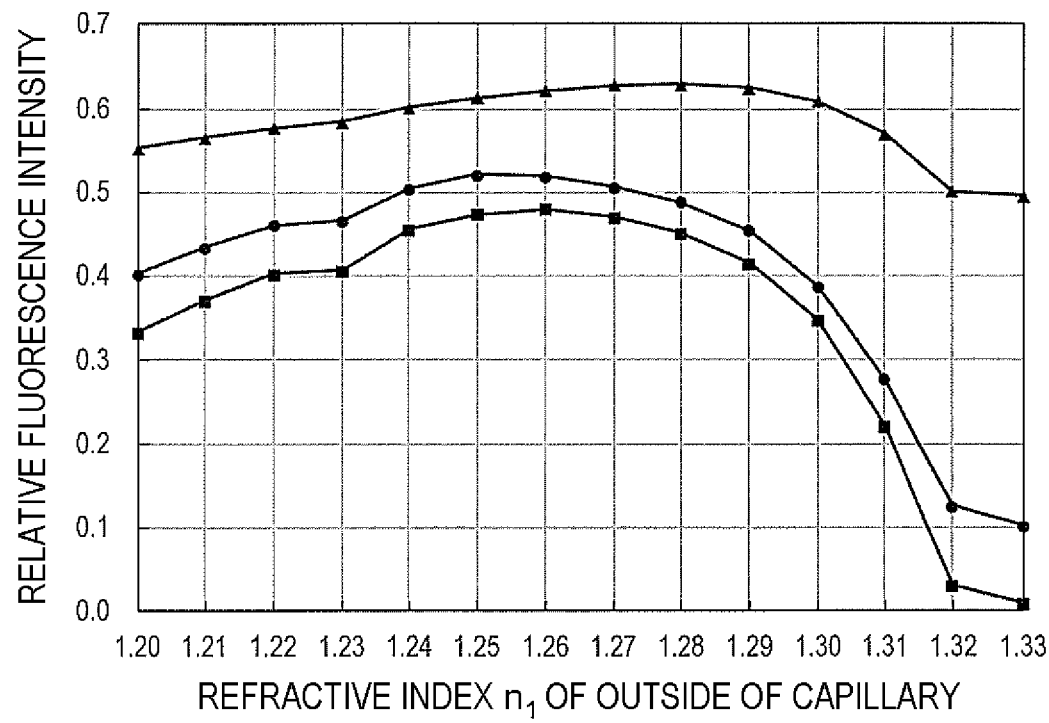
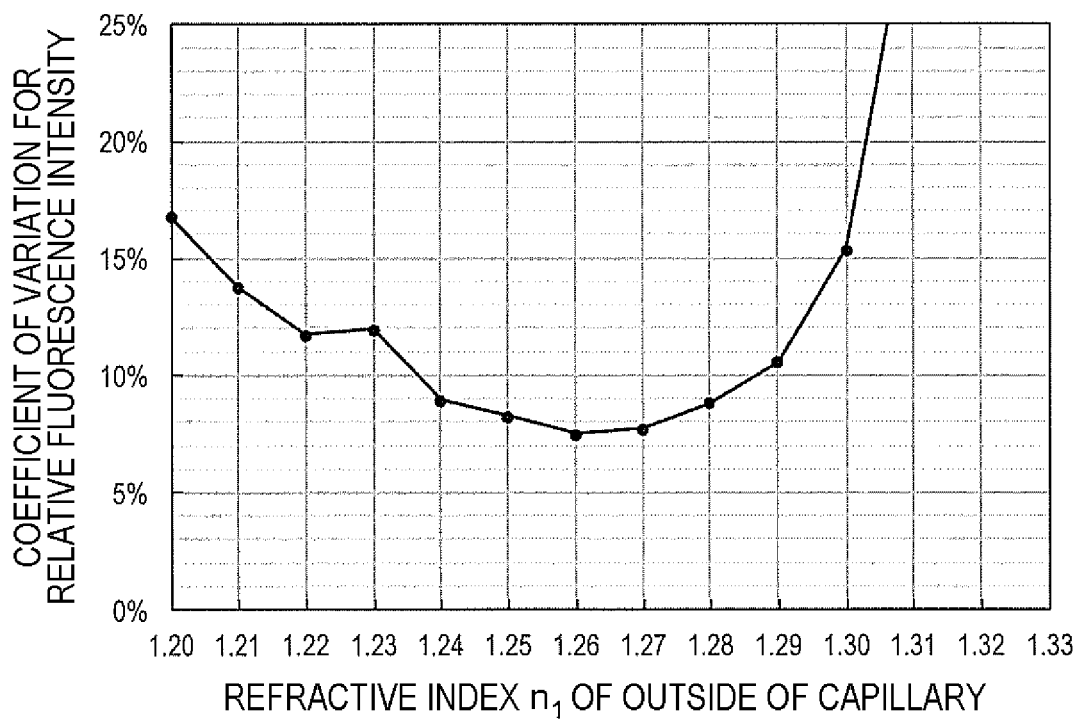

FIG. 22
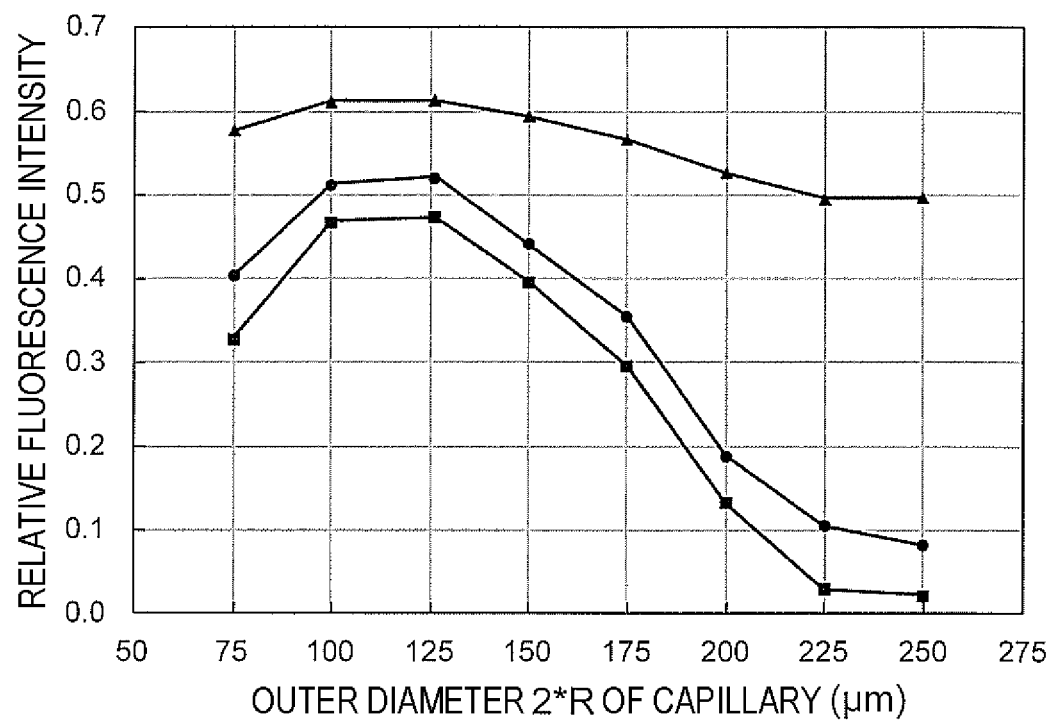
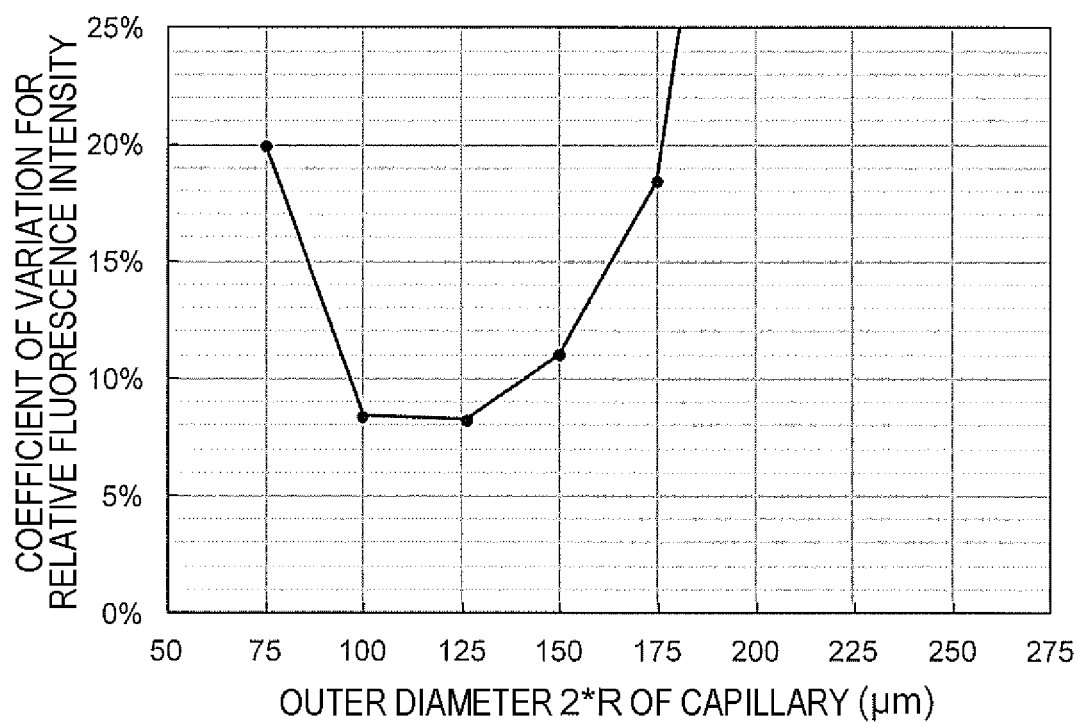

CAPILLARY ARRAY

TECHNICAL FIELD

The present disclosure relates to a capillary array.

BACKGROUND ART

A capillary-array-electrophoresis apparatus which includes a plurality of quartz glass capillaries filled with an electrolyte solution or an electrophoresis separation medium such as an electrolyte solution containing a polymer gel or a polymer and which performs electrophoretic analysis in parallel is widely used. Compared to the conventional capillary electrophoresis apparatuses using one capillary, the capillary-array-electrophoresis apparatus can not only improve the analysis throughput, but also can reduce the analysis cost per sample. The most widely used capillary-array-electrophoresis apparatuses are the 3500 Series Genetic Analyzer and the 3730 Series Genetic Analyzer commercially available from Thermo Fisher Scientific Inc. In the 3500 Series Genetic Analyzer, electrophoretic analysis can be performed in parallel in 8 or 24 capillaries, and in the 3730 Series Genetic Analyzer, electrophoretic analysis can be performed in parallel in 48 or 96 capillaries. In any case, laser-irradiation portions of the plurality of capillaries (portions irradiated with a laser beam in the capillary array) are arranged on the same plane. The polyimide coating of the capillaries in the laser-irradiation portions is removed. This same plane is referred to as an array plane. The plurality of capillaries arrayed on the array plane is referred to as a capillary array. When the capillary array is composed of N capillaries, a capillary number from 1 to N is given to each capillary in order from the end of the capillary array. During the electrophoresis, the plurality of capillaries are simultaneously irradiated with the laser beam by introducing the laser beam from the side of the array plane. Fluorescence is thus induced to be emitted from each capillary, and the emitted fluorescence is spectrally dispersed and detected at the same time. A method of simultaneously irradiating a plurality of capillaries with a laser beam which is incident from a side of an array plane is referred to as a multiple laser-beam-focusing method. The method is described in detail in PTL 1. In the multiple laser-beam-focusing method, each capillary acts as a convex lens. The laser beam is repeatedly focused by each capillary along the array plane and propagates through the capillary array, whereby the plurality of capillaries can be simultaneously irradiated. As a result, the same number of samples as the number of the capillaries can be subjected to DNA sequencing or DNA fragment analysis in parallel. As described in PTL 1, in laser-irradiation portions of a plurality of capillaries, an outer radius of the capillaries is defined as R (an outer diameter is 2R), an inner radius of the capillaries is defined as r (an inner diameter is 2r), a refractive index of a material of the capillaries is defined as $n_2$, a refractive index of a medium outside the capillaries is defined as $n_1$, a refractive index of a medium inside the capillaries (a separation medium) is defined as $n_3$, a distance between an incident position of a laser beam on a capillary array and an array plane is defined as x ($\leq$r), and x=r/2. A refraction angle when the laser beam is transmitted through one capillary is expressed by the following Formula (1).

[Mathematical Formula 1]

$$\Delta\theta = 2 \cdot \left\{ -\sin^{-1}\left(\frac{r}{2 \cdot R}\right) + \sin^{-1}\left(\frac{r \cdot n_1}{2 \cdot R \cdot n_2}\right) - \sin^{-1}\left(\frac{n_1}{2 \cdot n_2}\right) + \sin^{-1}\left(\frac{n_1}{2 \cdot n_3}\right) \right\} \quad (1)$$

Each capillary acts as a concave lens when $\Delta\theta>0$ is satisfied and a convex lens when $\Delta\theta<0$ is satisfied. By setting the conditions to satisfy $\Delta\theta<0$, multiple laser-beam focusing functions, and it becomes possible to simultaneously irradiate the plurality of capillaries with the laser beam. On the other hand, when the conditions satisfy $\Delta\theta>0$, the multiple laser-beam focusing does not function, and the laser beam diverges from the array plane. Therefore, simultaneous irradiation of the plurality of capillaries with the laser beam becomes impossible. The material of the capillary is generally quartz glass, and the refractive index thereof is fixed at $n_2$=1.46. It is understood from Formula (1) that the smaller $n_1$ and the larger $n_3$ are, the stronger the convex lens effect of each capillary is (the weaker the concave lens effect is). On the other hand, the larger $n_1$ and the smaller $n_3$ are, the stronger the concave lens effect of each capillary is.

Even in a case where the multiple laser-beam focusing functions, an intensity of the laser beam is attenuated as it travels through the capillary array due to reflection loss of the laser beam at an interface between the medium outside each capillary and the capillary, and at an interface between the medium inside each capillary and the capillary, and an obtained fluorescence intensity is also attenuated accordingly. In a case where the fluorescence intensities greatly vary between the capillaries, a plurality of samples cannot be analyzed under equivalent conditions, which is disadvantageous. (Meanwhile, although the fluorescence intensity is regarded as being representative of a signal intensity in the embodiment described later, a signal intensity other than the fluorescence intensity, for example, a scattering intensity and a light absorbance, may also be used.) Therefore, in the 3500 Series Genetic Analyzer and the 3730 Series Genetic Analyzer, a laser beam oscillated from one laser source is split into two and the two split laser beams are incident on the capillary array from both sides of the array plane, thus allowing the multiple laser-beam focusing to function for each. In this manner, the sum of the intensity of the laser beam incident from one side of the array plane and the intensity of the laser beam incident from the other side of the array plane is allowed to be uniform at each capillary. A configuration in which the laser beam is incident from only one side of the array plane is referred to as one-side irradiation. A configuration in which the two laser beams are incident from both sides of the array plane is referred to as both-side irradiation. Whether the multiple laser-beam focusing functions or not is common to both the one-side irradiation and the both-side irradiation. When the capillary array includes N capillaries, in the case of the one-side irradiation, capillary number of the capillary at the end on which the laser beam is incident is set to n=1 and capillary number of the capillary at the end from which the laser beam exits is set to n=N. In the case of the both-side irradiation, capillary number of the capillary at one end is set to n=1 and capillary number of the capillary at the opposite end is set to n=N.

Among the irradiation intensities and the fluorescence intensities of the plurality of capillaries in the same capillary array, it is preferable to have the lowest irradiation intensity and the lowest fluorescence intensity being as large as possible. It has been empirically found that, assuming that the value of the fluorescence intensity expected when the laser beam oscillated from the laser source irradiates the inside of one capillary at full intensity is 1, practical sensitivity is obtained if the minimum value (MIN) of the fluorescence intensity satisfies MIN≥0.2. In addition, it is preferable that variation in the irradiation intensities and the fluorescence intensities among the plurality of capillaries in the same capillary array is as small as possible. It has been empirically found that, in a case where the coefficient of variation (CV) of the fluorescence intensity satisfies CV≤20%, or CV≤15% depending on the situation, different samples can be analyzed under equivalent conditions. These (MIN≥0.2 and CV≤20%, or CV≤15%) are referred to as practical performance of the capillary-array-electrophoresis apparatus. In the present disclosure, since it is assumed that the fluorophore concentration in the laser-irradiation portion of each capillary is constant, the fluorescence intensity and the laser-irradiation intensity have the same meaning.

In the DNA sequencing or the DNA fragment analysis performed by the 3500 Series Genetic Analyzer and the 3730 Series Genetic Analyzer, a polymer solution containing a denaturing agent urea at a high concentration is used as a separation medium in order to separate DNA fragments contained in a sample by electrophoresis in a single-stranded state. In practice, POP-4, POP-6, and POP-7, which are the separation media commercially available for use in the 3500 Series Genetic Analyzer and the 3730 Series Genetic Analyzer, all contain 8 M urea. The refractive index of the polymer solutions containing 8 M urea rises to $n_3=1.41$, while the refractive index of pure water is 1.33. The convex lens effect of each capillary is thus strengthened, which is an advantageous condition for the multiple laser-beam focusing.

According to the configuration based on PTL 1, laser-irradiation portions of a plurality of capillaries having an outer diameter 2R=323 μm and an inner diameter 2r=50 μm in the 3500 Series Genetic Analyzer are placed in the air, that is, $n_1=1.00$. In this case, according to Formula (1) above, since $\Delta\theta=-1.3°$ is satisfied, each capillary has the convex lens effect. Therefore, since the multiple laser-beam focusing functions, simultaneous irradiation of 8 or 24 capillaries with a laser beam is possible. However, in this configuration, up to about 24 capillaries can be simultaneously irradiated, since the reflection loss of the laser beam at the interface between the air outside the capillary and the capillary (quartz glass) is great.

Therefore, according to the configuration disclosed in PTL 2, the number of capillaries that can be simultaneously irradiated is increased in the 3730 Series Genetic Analyzer. In the 3730 Series Genetic Analyzer, laser-irradiation portions of a plurality of capillaries having an outer diameter 2R=126 μm and an inner diameter 2r=50 μm are placed in a fluorine solution having a refractive index $n_1=1.29$. In this case, according to Formula (1) above, since $\Delta\theta=-0.69°$ is satisfied, each capillary has the convex lens effect and the multiple laser-beam focusing functions. Furthermore, the number of capillaries that can be simultaneously irradiated is increased, since the reflection loss of the laser beam at the interface between the fluorine solution outside the capillary and the capillary (quartz glass) is reduced. Therefore, simultaneous irradiation of 48 or 96 capillaries with the laser beam becomes possible.

In the configuration disclosed in NPL 1, the number of capillaries that can be simultaneously irradiated is further increased. In this configuration, laser-irradiation portions of a plurality of capillaries having an outer diameter 2R=126 μm and an inner diameter 2r=50 μm are placed in a matching solution having a refractive index $n_1=1.46$. Furthermore, among the capillary array (the plurality of capillaries), the odd-numbered capillaries from one end are used for analysis (hereinafter, referred to as analysis capillaries), and the even-numbered capillaries are used as rod lenses (hereinafter, referred to as lens capillaries). That is, the analysis capillaries and the lens capillaries are alternately arrayed. The refractive index of a medium inside the analysis capillaries (separation medium) is $n_3=1.41$, and the refractive index of a medium inside the lens capillaries is $n_4=1.53$. A material of both kinds of capillaries is quartz glass, and the refractive index thereof is $n_2=1.46$. The number of capillaries that can be simultaneously irradiated is further increased, since the reflection loss of the laser beam at the interface between the matching solution outside the capillary and the capillary (quartz glass) is zero. In addition, a definition of a maximum number of capillaries that can be simultaneously irradiated with a laser beam is described on P. 2874 to P. 2875 in NPL 1. When an incident intensity of the laser beam in the one-side irradiation is 100%, twice the number of capillaries with the laser-irradiation intensity of 50% or more is the maximum number of capillaries that can be simultaneously irradiated. This is because the irradiation intensity at each capillary is expected to be uniform in a capillary array having such number of capillaries with the both-side irradiation. According to this definition, the maximum number of capillaries in the configuration of PTL 2 is 150, and the maximum number of capillaries in the configuration of NPL 1 is 550.

As in NPL 1, the analysis capillaries and the lens capillaries are alternately arrayed in the capillary array in PTL 3. The capillary numbers n=1, 2, ..., N are assigned only to the analysis capillaries in order from the end of the capillary array. In other words, the total number of capillaries including the analysis capillaries and the lens capillaries is 2×N.

CITATION LIST

Patent Literature

PTL 1: JP 3654290 B2
PTL 2: JP 5039156 B2
PTL 3: JP 3559648 B2

Non Patent Literature

NPL 1: Electrophoresis 2006, 27, 2869-2879

SUMMARY OF INVENTION

Technical Problem

The number of capillaries that can be simultaneously irradiated in the above known techniques is evaluated based on the reflection loss. It is also evaluated whether or not there are practical performances in each technique. Such evaluation is performed for the first time in the present disclosure. In order to perform approximate evaluation of the transmittance of a laser beam by taking the reflection loss of the laser beam into consideration, it is assumed that the incident angle of the laser beam on each interface between two kinds of media having different refractive indices is 0°. The reflectance is represented by ref=$\{(n_1-n_2)/(n_1+n_2)\}^2$ and the transmittance is represented by tra=1−ref when light is incident on an interface between a medium having a refractive index $n_1$ and a medium having a refractive index $n_2$ at an incident angle of 0°. Thus, the transmittance T is approximately obtained by the following Formula (2) when the laser beam is transmitted through one capillary.

[Mathematical Formula 2]

$$T = \left\{1-\left(\frac{n_1-n_2}{n_1+n_2}\right)^2\right\}^2 \cdot \left\{1-\left(\frac{n_2-n_3}{n_2+n_3}\right)^2\right\}^2 \quad (2)$$

Under the conditions of the 3500 Series Genetic Analyzer based on PTL 1 described above, T is calculated to be T=93%. In practice, the laser beam contains a component of which the incident angle is not 0°, and the transmittance of the laser beam is slightly smaller than the value obtained from Formula (2). Therefore, Formula (2) represents ideal transmittance. In the case of the one-side irradiation, when the laser-irradiation intensity of the capillary with capillary number n=1 is assumed to be 1, L(n), i.e., the laser-irradiation intensity of the capillary with capillary number n is expressed by the following Formula (3).

[Mathematical Formula 3]

$$L(n) = T^{n-1} \quad (3)$$

That is, when the number of capillaries is N=24 in the 3500 Series Genetic Analyzer, the laser-irradiation intensity decreases to 0.19 at the capillary with capillary number n=24, because the laser-irradiation intensity is attenuated to 93% every time the laser beam passes through one capillary in the capillary array. On the other hand, in the case of the both-side irradiation, when the laser-irradiation intensities of the capillaries with capillary numbers n=1 and n=N are each assumed to be 0.5, L(n), i.e., the laser-irradiation intensity of the capillary with capillary number n is expressed by the following Formula (4).

[Mathematical Formula 4]

$$L(n) = 0.5 \cdot (T^{n-1} + T^{N-n}) \quad (4)$$

Unlike the case of the one-side irradiation, since attenuating intensities of the laser beams incident from both sides of the array plane are counterbalanced, the uniformity of the laser-irradiation intensity at each capillary is improved, and the minimum laser-irradiation intensity is increased. Note that the laser-irradiation intensity is the highest at the capillaries at both ends of the capillary array (capillary numbers of n=1 and n=N) and the lowest at the capillary located at the center of the capillary array (capillary number of n=(N+1)/2 when N is an odd number, or capillary numbers of n=N/2 and n=N/2+1 when N is an even number). That is, a graph showing L(n) against n is a downward convex distribution. Under the conditions of the 3500 Series Genetic Analyzer, when the number of capillaries is N=24, the laser-irradiation intensities at the capillaries located at both ends of the capillary array (capillary numbers of n=1 and n=24) are 0.60, and the laser-irradiation intensities at the capillaries located at the center of the capillary array (capillary numbers of n=12 and n=13) are 0.44, thus satisfying MIN≥0.2 for the practical performance. Furthermore, the coefficient of variation in the laser-irradiation intensities of the 24 capillaries is 11%, thus satisfying CV≤20% and CV≤15% for the practical performance.

However, under the conditions of the 3500 Series Genetic Analyzer, when the number of capillaries is N=48, the laser-irradiation intensities at the capillaries located at both ends of the capillary array (capillary numbers of n=1 and n=48) are 0.52, and the laser-irradiation intensities at the capillaries located at the center of the capillary array (capillary numbers of n=24 and n=25) are 0.19, and thus MIN≥0.2 for the practical performance is not satisfied. Furthermore, the coefficient of variation in the laser-irradiation intensities is 35%, and thus both CV≤20% and CV≤15% for the practical performance are not satisfied. In other words, even when the both-side irradiation is adopted, the uniformity of the laser-irradiation intensity at each capillary decreases, and the minimum laser-irradiation intensity decreases. Therefore, it is difficult to simultaneously irradiate the 48 capillaries under such conditions.

Under the conditions of the 3730 Series Genetic Analyzer based on PTL 2, T=99% is obtained according to Formula (2), and the transmittance is significantly improved compared to that under the conditions of the 3500 Series Genetic Analyzer. Moreover, when the number of capillaries is N=48 in Formula (4), the laser-irradiation intensities at the capillaries located at both ends of the capillary array (capillary numbers of n=1 and n=48) are 0.78, and the laser-irradiation intensities at the capillaries located at the center of the capillary array (capillary numbers of n=24 and n=25) are 0.74, thus satisfying MIN≥0.2 for the practical performance. Furthermore, the coefficient of variation in the laser-irradiation intensities of the 48 capillaries is 1%, thus satisfying CV≤20% and CV≤15% for the practical performance. In addition, when the number of capillaries is N=96 in Formula (4), the laser-irradiation intensities at the capillaries located at both ends of the capillary array (capillary numbers of n=1 and n=96) are 0.65, and the laser-irradiation intensities at the capillaries located at the center of the capillary array (capillary numbers of n=48 and n=49) are 0.55, thus satisfying MIN≥0.2 for the practical performance. Furthermore, the coefficient of variation in the laser-irradiation intensities of the 96 capillaries is 5%, thus satisfying CV≤20% and CV≤15% for the practical performance. As described above, the uniformity of the laser-irradiation intensities at 48 and 96 capillaries is improved, and the minimum laser-irradiation intensity increases, whereby simultaneous irradiation of the 48 and 96 capillaries becomes possible.

In order to compare the configuration of PTL 3 with those of PTL 2 and NPL 1, the conditions are standardized within a possible range. In the configuration of PTL 3, laser-irradiation portions of a plurality of capillaries having an outer diameter 2R=126 μm and an inner diameter 2r=50 μm are placed in water having a refractive index $n_1$=1.33. The refractive index of a medium inside the analysis capillaries (separation medium) is $n_3$=1.41. The refractive index of a medium inside the lens capillaries is $n_4$=1.46. The materials of both types of capillaries are made of quartz glass having $n_2$=1.46. In this case, according to Formula (1), the refraction angle by one analysis capillary is $\Delta\theta_A$=+0.03°, while the refraction angle by one lens capillary is $\Delta\theta_B$=−2.1°. Since $\Delta\theta_A+\Delta\theta_B$=−2.07°, one set of one analysis capillary and one lens capillary exhibits the convex lens effect, the multiple laser-beam focusing functions. As described above, a method using the value of $\Delta\theta_A+\Delta\theta_B$ for evaluating whether or not the multiple laser-beam focusing functions is discovered in the present disclosure. Under the present conditions, according to Formula (2), the transmittance of one analysis capillary is $T_A$=99.5%, and the transmittance of one lens capillary is $T_B$=99.6%. Therefore, the transmittance of one set of one analysis capillary and one lens capillary is $T=T_A\times T_B$=99.1%. When the number of the analysis capillaries is N=96 in Formula (4), the laser-irradiation intensities at the analysis capillaries located at both ends of the capillary array (capillary numbers of n=1 and n=96) are 0.71, and the laser-irradiation intensities at the capillaries located at the center of the capillary array (capillary numbers of n=48 and n=49) are 0.64, thus satisfying MIN≥0.2 for the practical performance. Furthermore, the coefficient of variation in the laser-irradiation intensities of the 96 analysis capillaries is 3%, thus satisfying CV≤20% and CV≤15% for the practical performance.

In all of the known techniques described above, the separation media contain high concentration of urea having $n_3=1.41$. On the other hand, separation media in capillary electrophoresis apparatuses using one capillary do not always contain a high concentration of urea, and various kinds of separation media are used. For example, a separation medium for separating DNA fragments in a double-stranded state by electrophoresis does not contain urea, and a refractive index thereof is $n_3=1.33$, which is the same as that of water. That is, the refractive indices of separation media used in capillary electrophoresis can be generally various values from $1.33 \leq n_3 \leq 1.41$. In recent years, in order to increase throughput or reduce cost of electrophoretic analysis using such various kinds of separation media, it is required that the various kinds of separation media are used in a capillary-array-electrophoresis apparatus.

However, in the configurations of all of the known techniques described above, the convex lens effect of each capillary is lost, and the concave lens effect is strengthened when $n_3=1.33$, and thus the multiple laser-beam focusing does not function. In other words, it becomes impossible to perform parallel electrophoretic analysis using a plurality of capillaries. Specifically, it is as follows.

When $n_3=1.33$ in the 3500 Series Genetic Analyzer based on PTL 1, $\Delta\theta=+1.3°$ according to Formula (1), whereby each capillary has the concave lens effect. Therefore, the multiple laser-beam focusing does not function, and simultaneous irradiation of 8 or 24 capillaries with a laser beam becomes impossible.

When $n_3=1.33$ in the 3730 Series Genetic Analyzer based on PTL 2, $\Delta\theta=+2.9°$ according to Formula (1), whereby each capillary has the concave lens effect. Therefore, the multiple laser-beam focusing does not function, and it becomes impossible to perform simultaneous irradiation of 48 or 96 capillaries with a laser beam.

When $n_3=1.33$ in the configuration based on NPL 1, according to Formula (1), the refraction angle by one analysis capillary is $\Delta\theta_A=+6.6°$, while the refraction angle by one lens capillary is $\Delta\theta_B=-3.0°$. Since $\Delta\theta_A+\Delta\theta_B+3.60$, one set of one analysis capillary and one lens capillary exhibits the concave lens effect, the multiple laser-beam focusing does not function. When $n_3=1.41$ in the configuration based on NPL 1, according to Formula (1), the refraction angle by one analysis capillary is $\Delta\theta_A=+2.4°$, while the refraction angle by one lens capillary is $\Delta\theta_B=-3.00$. Since $\Delta\theta_A+\Delta\theta_B=-0.6°$ is obtained, one set of one analysis capillary and one lens capillary exhibits the convex lens effect, and the multiple laser-beam focusing functions. P. 2875 of NPL 1 describes that the configuration of NPL1 functions advantageously even in a case where $n_3=1.33$. However, according to the definition of the maximum number of capillaries in NPL 1 described above, the maximum number of capillaries in the case of $n_3=1.33$ is only about 8, as can be seen from FIG. 11 of NPL 1. Therefore, the configuration of NPL 1 does not function in the case of $n_3=1.33$.

When $n_3=1.33$ in the configuration based on PTL 3, according to Formula (1), the refraction angle by one analysis capillary is $\Delta\theta_A=+3.7°$, while the refraction angle by one lens capillary is $\Delta\theta_B=-2.1°$. Since $\Delta\theta_A+\Delta\theta_B=+1.6°$ is obtained, one set of one analysis capillary and one lens capillary exhibits the concave lens effect, and the multiple laser-beam focusing does not function. Therefore, a plurality of capillaries cannot be simultaneously irradiated with a laser beam.

In view of such a situation, the present disclosure proposes a technique that enables electrophoretic analysis even when using various separation media having any refractive indices within a range of $1.33 \leq n_3 \leq 1.41$ (or outside the range of $1.33 \leq n_3 \leq 1.41$ as a matter of course) in a capillary-array-electrophoresis apparatus.

Solution to Problem

In order to solve the above problems, the present disclosure proposes, for example, a capillary array where laser-irradiation portions of N analysis capillaries used in electrophoretic analysis and laser-irradiation portions of N±1 lens capillaries not used in electrophoretic analysis are alternately arrayed approximately on the same array plane, wherein N is an integer of 2 or more. In the capillary array, R, r, $n_1$, $n_2$, and $n_4$ satisfy a predetermined relationship, wherein an outer radius, an inner radius, a refractive index of a medium of an outside, and a refractive index of a material of the N analysis capillaries and the N±1 lens capillaries in the laser-irradiation portions are defined as R, r, $n_1$, and $n_2$, a refractive index of a medium of an inside of the N analysis capillaries in the laser-irradiation portions is defined as $n_3$, a refractive index of a medium of an inside of the N±1 lens capillaries in the laser-irradiation portions is defined as $n_4$, and it is assumed that $n_3<1.36$ is satisfied.

Additional features related to the present disclosure will become apparent from the description in the present specification and the accompanying drawings. In addition, aspects of the present disclosure are achieved and realized by elements, combinations of various elements, and aspects in the following detailed description and appended claims.

It should be understood that the description in the present specification is merely exemplary, and is not intended to limit the claims or application examples of the present disclosure in any way.

Advantageous Effects of Invention

According to the technique of the present disclosure, in a capillary-array-electrophoresis apparatus, it is possible to perform electrophoretic analysis using various separation media having any refractive indices within the range of $1.33 \leq n_3 \leq 1.41$. In particular, it is possible to perform capillary electrophoretic analysis using a separation medium having a low refractive index which is the same as or close to the refractive index of pure water 1.33. As a result, it is possible to greatly expand the range of applications of the capillary-array-electrophoresis apparatus while improving analysis throughput or reducing analysis cost per sample.

Problems, configurations, and effects other than those described above will be clarified by the following description of embodiments.

BRIEF DESCRIPTION OF DRAWINGS

FIG. 5 is a diagram showing relative fluorescence intensity distributions in the capillary array based on PTL 1.

FIG. 7 is a diagram showing relative fluorescence intensity distributions in the capillary array of the present disclosure.

FIG. 21 is a diagram for describing the influence of a refractive index of an outside of a capillary on relative fluorescence intensity and coefficient of variation therefor.

FIG. 22 is a diagram for describing the influence of an outer diameter of a capillary on relative fluorescence intensity and coefficient of variation therefor.

DESCRIPTION OF EMBODIMENTS

Figure 1:
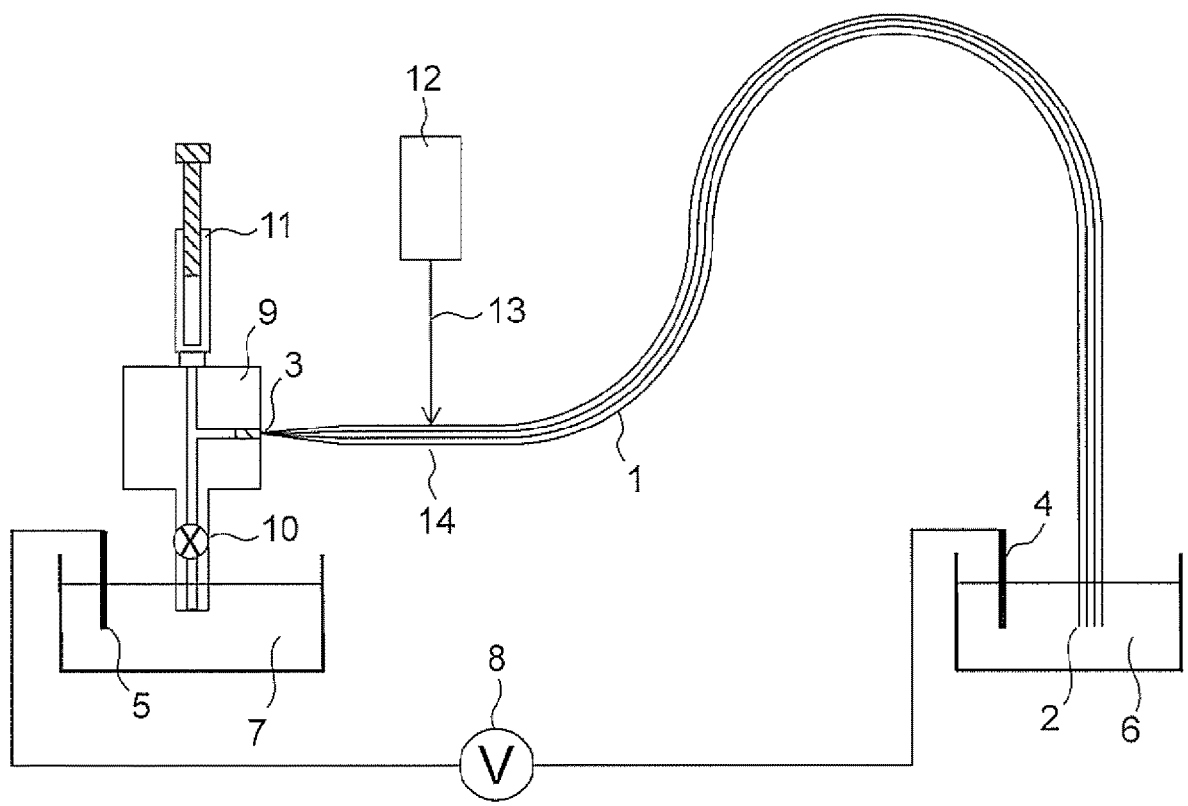
FIG. 1 is a diagram illustrating a configuration example of a capillary-array-electrophoresis apparatus.

The technique of the present disclosure relates to a capillary-array-electrophoresis apparatus that simultaneously analyzes a plurality of samples by simultaneously irradiating a plurality of capillaries with a laser beam and by detecting fluorescence emitted from each capillary at the same time during electrophoresis performed using the plurality of capillaries.

(A) Outline of Technique of Present Disclosure

The present disclosure mainly proposes a technique that enables the use of a separation medium having a low refractive index that is equivalent to that of pure water 1.33, or is lower than 1.36. In a case where the separation medium having a low refractive index is used, it is difficult to simultaneously irradiate a plurality of capillaries with a laser beam because multiple laser-beam focusing does not function even when a technique disclosed in any of the known examples (PTLs 1 to 3 and NPL 1) is applied.

The present disclosure also proposes a technique by which capillary electrophoretic analysis can be performed by using not only the separation medium having a low refractive index described above, but also a separation medium having a high refractive index, typically, a refractive index of 1.36 or higher and 1.42 or lower. The maximum number of capillaries that can be simultaneously irradiated is preferably large, and can be 24 or more, or 48 or more depending on the situation. As described above, among the irradiation intensities and the fluorescence intensities of the plurality of capillaries in the same capillary array, it is preferable to make the lowest irradiation intensity and the lowest fluorescence intensity as high as possible. Let the fluorescence intensity expected when the laser beam oscillated from the laser source irradiates the inside of one capillary at full intensity be 1. In this case, it has been empirically found that sensitivity suitable for practical use is obtained if the minimum value (MIN) of the fluorescence intensity satisfies MIN≥0.2. In addition, the smaller variation in the irradiation intensities and the fluorescence intensities among the plurality of capillaries in the same capillary array is, the more preferable it is. It has been empirically found that, when the coefficient of variation (CV) of the irradiation intensity and the fluorescence intensity satisfy CV≤20%, or CV≤15% depending on the situation, it is possible to analyze different samples under equivalent conditions. The present disclosure aims to satisfy such requirements for the practical performance of the capillary-array-electrophoresis apparatus.

As a result of performing intensive studies under the above object, when an outer diameter and an inner diameter of each capillary in a capillary array are respectively 2R=126 μm and 2r=50 μm, while an outside, a material, and an inside of each capillary in the capillary array are respectively air having a refractive index $n_1$=1.00, quartz glass having a refractive index $n_2$=1.46, and a separation medium having a refractive index $n_3$=1.33, Δθ=−3.2° is obtained according to Formula (1). Therefore, it was found that each capillary exhibits a convex lens effect, and the multiple laser-beam focusing functions. In the 3500 Series Genetic Analyzer based on PTL 1, under the condition of $n_3$=1.33, the outer diameter 2R of each capillary is reduced from 323 μm to 126 μm. As a result, the concave lens effect of each capillary is converted to the convex lens effect.

When the number of capillaries is N=24, and the above conditions are substituted into Formula (2) and Formula (4), the laser-irradiation intensities at the capillaries located at both ends of the capillary array (n=1 and n=24) are 0.59, and the laser-irradiation intensities at the capillaries located at the center of the capillary array (n=12 and n=13) are 0.42, thus satisfying MIN≥0.2 for the practical performance. Furthermore, the coefficient of variation in the laser-irradiation intensity of the 24 capillaries is 12%, thus satisfying CV≤20% and CV≤15% for the practical performances. As a result of further studies, it was found that, when the outer diameter 2R of each capillary is 220 μm or less, since Δθ<0 is satisfied, the convex lens effect functions. Generalizing without limiting to the case where the inner diameter of each capillary is 2r=50 μm, it was found that, since Δθ<0 is satisfied when R/r≤4.4, the convex lens effect functions. A separation medium having a low refractive index $n_3$=1.33 is not studied in PTL 1. That is, the conditions described above are found for the first time in the technique of the present disclosure.

Furthermore, in a case where the capillary outer diameter is 2R=126 μm, and the capillary inner diameter is 2r=50 μm, when the refractive index of a separation medium inside each capillary is $n_3$=1.34, 1.35, or 1.36, Δθ=−3.5°, −3.8°, or −4.2°, respectively, according to Formula (1), it was found that each capillary exhibits the convex lens effects and the multiple laser-beam focusing functions. As a result of further studies, it was found that in a case where the outer diameter 2R of each capillary is 240 μm or less, 264 μm or less, or 293 μm or less, since Δθ<0 is satisfied, the convex lens effect functions. By generalization, when R/r≤4.8, R/r≤5.3, or R/r≤5.9, since Δθ<0 is satisfied, the convex lens effect functions. In other words, it was found that the value of R/r preferably satisfies R/r<5.9 when using a separation medium having a low refractive index of lower than 1.36. Such a separation medium having a low refractive index is not studied in PTL 1. That is, the conditions described above are found for the first time in the technique of the present disclosure.

On the other hand, when the number of capillaries is N=48 under the conditions in which the capillary outer diameter is 2R=126 μm, the capillary inner diameter is 2r=50 μm, the outside of the capillaries is air having a refractive index $n_1$=1.00, the material of the capillaries is quartz glass having a refractive index $n_2$=1.46, and the inside of the capillaries is a separation medium having a refractive index $n_3$=1.33, the laser-irradiation intensities at the capillaries located at both ends of the capillary array (n=1 and n=48) are 0.51, and the laser-irradiation intensities at the capillaries located at the center of the capillary array (n=24 and n=25) are 0.17 according to Formula (2) and Formula (4), and thus MIN≥0.2 for the practical performance is not satisfied. Furthermore, the coefficient of variation in the laser-irradiation intensity of the 48 capillaries is 38%, and thus both CV≤20% and CV≤15% for the practical performances are not satisfied. Therefore, the present conditions are not suitable for simultaneous irradiation of 48 or more capillaries.

A novel configuration was thus devised to enable the simultaneous irradiation of 48 or more capillaries with a laser beam while using a separation medium having a low refractive index. Similarly to the configurations shown in NPL 1 and PTL 3, a capillary array is formed by alternately arranging analysis capillaries and lens capillaries. Here, the numbers of the analysis capillaries and the lens capillaries are not necessarily the same. In a case where both ends of the capillary array are analysis capillaries, N analysis capillaries and N−1 lens capillaries may be alternately arranged, where N is an integer of 2 or more. In a case where both ends of the capillary array are lens capillaries, N analysis capillaries and N+1 lens capillaries may be alternately arranged. The capillary numbers n=1, 2, . . . , N are assigned only to the analysis capillaries. Laser-irradiation portions of a plurality of capillaries having an outer diameter 2R=126 μm and an inner diameter 2r=50 μm are arranged in a fluorine solution having a refractive index $n_1$=1.25. A material of the capillaries is quartz glass having a refractive index $n_2$=1.46. Insides of the analysis capillaries hold a separation medium having a refractive index $n_3$=1.33. Insides of the lens capillaries hold a matching solution having a refractive index $n_4$=1.46. In this case, according to Formula (1), the refraction angle by one analysis capillary is $\Delta\theta_A$=+2.0°, while the refraction angle by one lens capillary is $\Delta\theta_B$=−3.3°. Since $\Delta\theta_A+\Delta\theta_B$=0.3°, one set of one analysis capillary and one lens capillary exhibits the convex lens effect, and the multiple laser-beam focusing functions. Under the present conditions, according to Formula (2), the transmittance of one analysis capillary is $T_A$=98.4%, and the transmittance of one lens capillary is $T_B$=98.8%. Therefore, the transmittance of one set of one analysis capillary and one lens capillary is $T=T_A \times T_B$=97.2%. Therefore, when the number of the analysis capillaries is N=48 in Formula (4), the laser-irradiation intensities at the capillaries located at both ends of the capillary array (n=1 and n=48) are 0.63, and the laser-irradiation intensities at the capillaries located at the center of the capillary array (n=24 and n=25) are 0.51 according to Formula (2) and Formula (4), thus satisfying MIN≥0.2 for the practical performance. Furthermore, the coefficient of variation in the laser-irradiation intensity of the 48 capillaries is 7%, thus satisfying both CV≤20% and CV 15% for the practical performances.

Next, when the number of the capillaries is N=72, the laser-irradiation intensities at the capillaries located at both ends of the capillary array (n=1 and n=72) are 0.57, and the laser-irradiation intensities at the capillaries located at the center of the capillary array (n=36 and n=37) are 0.36 according to Formula (2) and Formula (4), thus satisfying MIN≥0.2 for the practical performance. Furthermore, the coefficient of variation in the laser-irradiation intensity of the 72 capillaries is 14%, thus satisfying both CV≤20% and CV≤15% for the practical performances. In addition, when the number of the capillaries is N=96, the laser-irradiation intensities at the capillaries located at both ends of the capillary array (n=1 and n=96) are 0.53, and the laser-irradiation intensities at the capillaries located at the center of the capillary array (n=48 and n=49) are 0.26 according to Formula (2) and Formula (4), thus satisfying MIN≥0.2 for the practical performance. Furthermore, the coefficient of variation in the laser-irradiation intensity of the 96 capillaries is 24%, and thus CV≤20% and CV≤15% for the practical performances are not satisfied. It is needless to say that, under the above conditions, the performance of all of the above indices is improved by returning $n_3$=1.33 to $n_3$=1.41. Except for changing $n_3$=1.41 to $n_3$=1.33, the present configuration is significantly different from the configuration of PTL 2, the configuration of NPL 1, and the configuration of PTL 3. In PTL 2, the lens capillaries are not used, and the refractive index of the medium of the outside of the capillaries is $n_1$=1.29, which are all not satisfied in the configuration of the present disclosure. Furthermore, in NPL 1, the refractive index of the medium of the outside of the capillaries is $n_1$=1.46, and the inside of the lens capillaries is a solution having a high refractive index $n_4$=1.53, which are all not satisfied in the configuration of the present disclosure. In addition, in PTL 3, the refractive index of the medium of the outside of the capillaries is $n_1$=1.33, which is not satisfied in the configuration of the present disclosure. As described above, such differences represent different functions arising from essentially different structures, and are not due to mere design changes.

Hereinafter, each embodiment of the present disclosure will be described in detail. Although each embodiment will be separately described below, the techniques shown in each embodiment are not exclusive and can be combined with each other as appropriate.

(B) First Embodiment

<Configuration Example of Capillary-Array-Electrophoresis Apparatus>

FIG. 1 is a diagram illustrating a configuration example of a capillary-array-electrophoresis apparatus. In the present capillary-array-electrophoresis apparatus, double-stranded DNA fragment analysis is performed in addition to the DNA sequencing and single-stranded DNA fragment analysis performed in the conventional capillary-array-electrophoresis apparatuses. In the present embodiment, using 24 capillaries (note that only 4 capillaries are shown in FIG. 1), DNA sequencing of different sample is first performed in each capillary, and then the double-stranded DNA fragment analysis of different sample is performed in each capillary. The samples for the DNA sequencing contain single-stranded DNA fragments of various lengths labeled with 4 kinds of fluorophores corresponding to the 4 kinds of bases at each fragment end. The electrophoresis separation medium with which each capillary is filled when performing the DNA sequencing is a polymer solution containing 8M urea as a denaturing agent, and its refractive index is $n_3=1.41$. By contrast, the samples for the double-stranded DNA fragment analysis contain double-stranded DNA fragments of various lengths labeled with 2 kinds of fluorophores. The double-stranded DNA fragments labeled with one fluorophore are PCR products, and the double-stranded DNA fragments labeled with the other fluorophore are size markers. The electrophoresis separation medium with which each capillary is filled when performing the double-stranded DNA fragment analysis is a polymer solution which does not contain urea as a denaturing agent, and its refractive index is $n_3=1.33$. One analysis session was performed by the following steps (i) to (vi).

(i) First, sample-injection ends 2 of 24 capillaries 1 were immersed in a cathode-side buffer solution 6, and sample-elution ends 3 of the 24 capillaries were connected to an anode-side buffer solution 7 via a polymer solution in a polymer block 9.

(ii) Next, a valve 10 of the polymer block 9 was closed, the piston of a syringe 11 connected to the polymer block 9 was pushed down to pressurize the polymer solution in the syringe 11 and the polymer block 9, and the inside of each capillary 1 was filled with the polymer solution from the sample-elution end 3 toward the sample-injection end 2.

(iii) Subsequently, the valve 10 was opened, a different sample was injected into each capillary 1 from the sample-injection end 2 by an electric field, and then a high voltage was applied between a cathode 4 and an anode 5 by a power source 8, thus starting capillary electrophoresis. DNA fragments labeled with the multiple kinds of fluorophores were electrophoresed from the sample-injection end 2 toward the sample-elution end 3 in each capillary 1.

(iv) Concurrently, a position on each capillary 1 where the DNA fragments were electrophoresed a certain distance from the sample-injection end 2 was a laser-irradiation portion 14. The laser-irradiation portions 14 were collectively irradiated with a laser beam 13 oscillated from a laser source 12 by the multiple laser-beam-focusing method. Here, the coating of each capillary 1 in the vicinity of the laser-irradiation portion 14 was removed in advance. The capillaries 1 was arranged on an array plane in the vicinity of the laser-irradiation portion 14. The laser beam 13 was focused and incident on the laser-irradiation portions 14 along the array plane from the side of the array plane. Although FIG. 1 depicts the irradiation with the laser beam 13 as being the one-side irradiation for the sake of simplicity, the both-side irradiation was performed in reality by splitting the laser beam 13 into two.

(v) Then, the DNA fragments labeled with the multiple kinds of fluorophores were electrophoresed in each capillary 1 and irradiated with the laser beam 13 when passing through the laser-irradiation portion 14, whereby the labeled fluorophores were excited to emit fluorescence. That is, the multiple kinds of fluorophores emitted fluorescence from 24 emission points (laser-irradiation portions). Each fluorescence intensity changed from moment to moment with the electrophoresis.

(vi) Finally, the sample injected into each capillary was analyzed by detecting the fluorescence emitted from each emission point in multiple colors and analyzing the obtained time-series data.

Although the above steps (i) to (vi) are common to the case of performing the DNA sequencing and the case of performing the double-stranded DNA fragment analysis, the polymer solution and the buffer solution are appropriately changed in the two cases. That is, the capillary-array-electrophoresis apparatus of the present embodiment can execute a plurality of analysis modes with different conditions. An arbitrary analysis mode is selected from the plurality of analysis modes and executed. The plurality of analysis modes includes, for example, a first analysis mode for the double-stranded DNA fragment analysis and a second analysis mode for the DNA sequencing. In each analysis mode, it is effective to appropriately change the conditions for the electrophoretic analysis according to the purpose thereof. As changeable conditions for electrophoretic analysis, there are a controlled temperature of the capillaries, an electric-field strength during the electrophoresis, an electric-field strength and a time during the sample injection, a laser-irradiation intensity, an exposure time for a sensor, and the like. It may be effective to change the controlled temperature of the capillaries in each analysis mode, for example, by adjusting the temperature to 30° C. in the first analysis mode and adjusting the temperature to 60° C. in the second analysis mode. Note that the terms "first" and "second" are merely added for the sake of convenience to distinguish among the analysis modes and do not indicate the order in which the analysis modes are executed. In the above example, the refractive index of the electrophoresis separation medium in the double-stranded DNA fragment analysis is $n_3=1.33$, and the refractive index of the electrophoresis separation medium in the DNA sequencing is $n_3=1.41$. Therefore, the refractive index of the electrophoresis separation medium in the first analysis mode is $n_3<1.36$, and the refractive index of the electrophoresis separation medium in the second analysis mode is $n_3 \geq 1.36$. According to circumstances, it is possible to set the refractive index of the electrophoresis separation medium in the first analysis mode to $1.33 \leq n_3 < 1.36$ and to set the refractive index of the electrophoresis separation medium in the second analysis mode to $1.36 \leq n_3 \leq 1.42$. The analysis session consisting of the steps (i) to (vi) can also be repeated multiple times. For example, a number of different samples can be analyzed by analyzing samples 1 to 24 in the first analysis session, analyzing samples 25 to 48 in the second analysis session, and so on. In this case, the DNA sequencing may be repeated using the same polymer solution and buffer solution, or the DNA sequencing may be switched in the middle to the double-stranded DNA fragment analysis. Any application can be selected in any analysis session.

<Configuration Example of Optical System for Fluorescence Detection>

Figure 2:
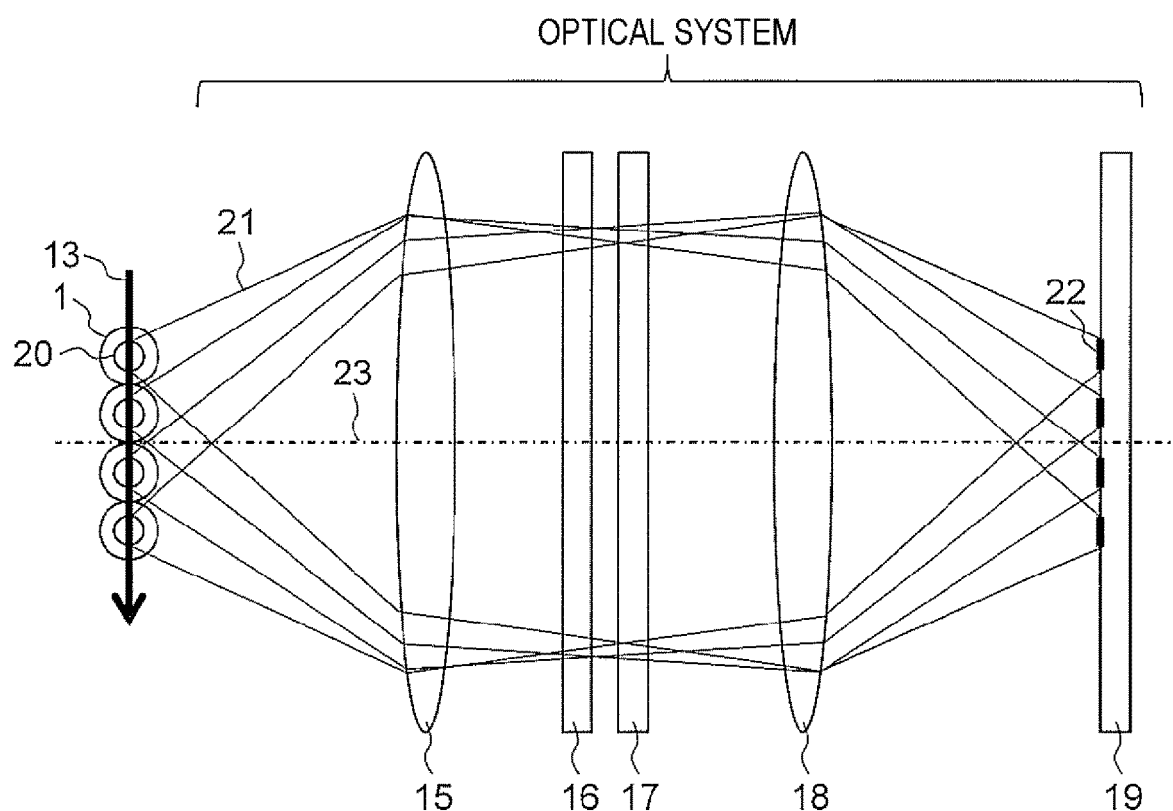
FIG. 2 is a diagram illustrating a configuration example of an optical system of the capillary-array-electrophoresis apparatus.

FIG. 2 is a cross-sectional diagram illustrating a configuration example of an optical system that performs fluorescence detection in the capillary-array-electrophoresis apparatus. The present optical system is located on the back side of the laser-irradiation portions 14 in FIG. 1. Similarly to FIG. 1, FIG. 2 depicts the one-side irradiation of an array of 4 capillaries, but the both-side irradiation of an array of 24 capillaries was performed in reality. The capillaries 1 arranged on the array plane were simultaneously irradiated with the laser beam 13 by multiple laser-beam-focusing method. Each of the laser-irradiation portions 14 of the capillaries 1 serves as a fluorescence-emission point 20. Fluorescence 21 emitted from each emission point 20 was collectively collimated by a condenser lens 15, transmitted through a transmission grating 17 for wavelength dispersion in the central axis direction of each capillary, and imaged as an imaging point 22 on a sensor 19 by an imaging lens 18. The laser light was blocked by a laser-cut filter 16. The sensor 19 may be an area sensor such as a CCD or a CMOS or a sensor capable of simultaneously measuring a plurality of imaging points 22 such as a photodiode array. In reality, each imaging point 22 is subjected to wavelength dispersion in the depth direction of FIG. 2, but a single wavelength portion of each imaging point 22 is schematically depicted in FIG. 2.

In such an optical system, the light condensing efficiency decreases with the distance of the emission point 20 from an optical axis 23 of the optical system. As shown in FIG. 2, such decrease in the light condensing efficiency occurs, since the light-collection angle of the fluorescence 21 emitted from the emission point 20 distant from the optical axis 23 is reduced by the vignetting effect of the optical system. Therefore, even in a case where fluorescence of an equal intensity is emitted from each emission point 20, the fluorescence intensity at the imaging point 22 decreases with the distance between the corresponding emission point 20 and the optical axis 23. How much vignetting effect exists, that is, an optical-system-correction coefficient based on the vignetting effect is determined by the optical system and can be examined by calculation or experiment. Using the optical-system-correction coefficient based on the vignetting effect, the fluorescence intensity at each imaging point 22 can be calculated from the fluorescence intensity at each emission point 20.

<Configuration Example of System for Data Analysis and Apparatus Control>

Figure 3:
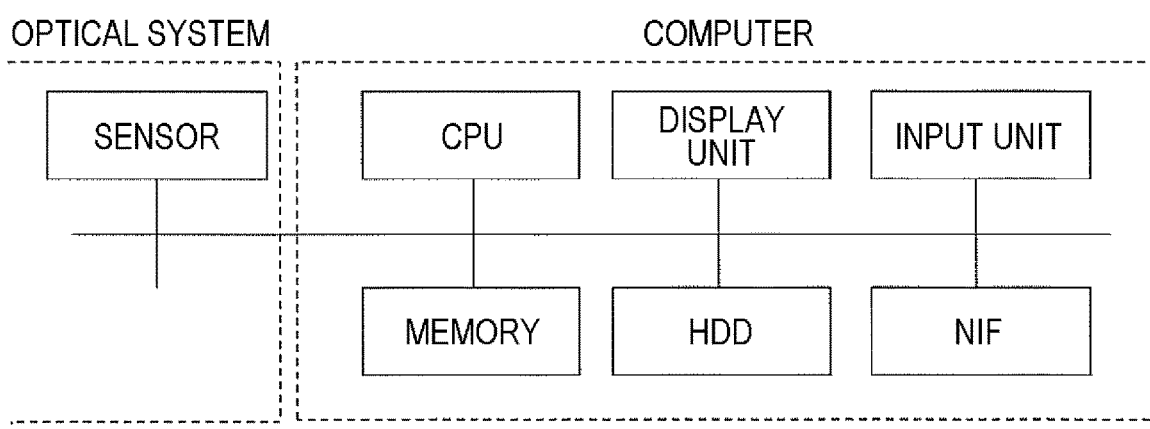
FIG. 3 is a diagram illustrating a configuration example showing coordination between a sensor and a computer.

FIG. 3 is a diagram illustrating a configuration example showing coordination between the sensor and a computer. The optical system is a part of the capillary-array-electrophoresis apparatus. The sensor is a part of the optical system. The computer is connected to the capillary-array-electrophoresis apparatus. The computer not only performs data analysis, but also controls the capillary-array-electrophoresis apparatus. Condition setting for the data analysis and condition setting for the capillary-array-electrophoresis apparatus control are performed through an input unit such as a touch panel, a keyboard, or a mouse. Time-series raw data of signals output from the sensor is sequentially stored in a memory. Analysis parameter information stored in the database inside an HDD is also stored in the memory. Using the analysis parameter information stored in the memory, a CPU analyzes the time-series raw data stored in the memory, derives time-series analysis data, sequentially stores the time-series analysis data in the memory, and displays the time-series analysis data on a monitor corresponding to a display unit. The analysis results can also be collated with information on network through network interface NIF.

<Configuration Example of Conventional Capillary Array (PTL 1)>

Figure 4:
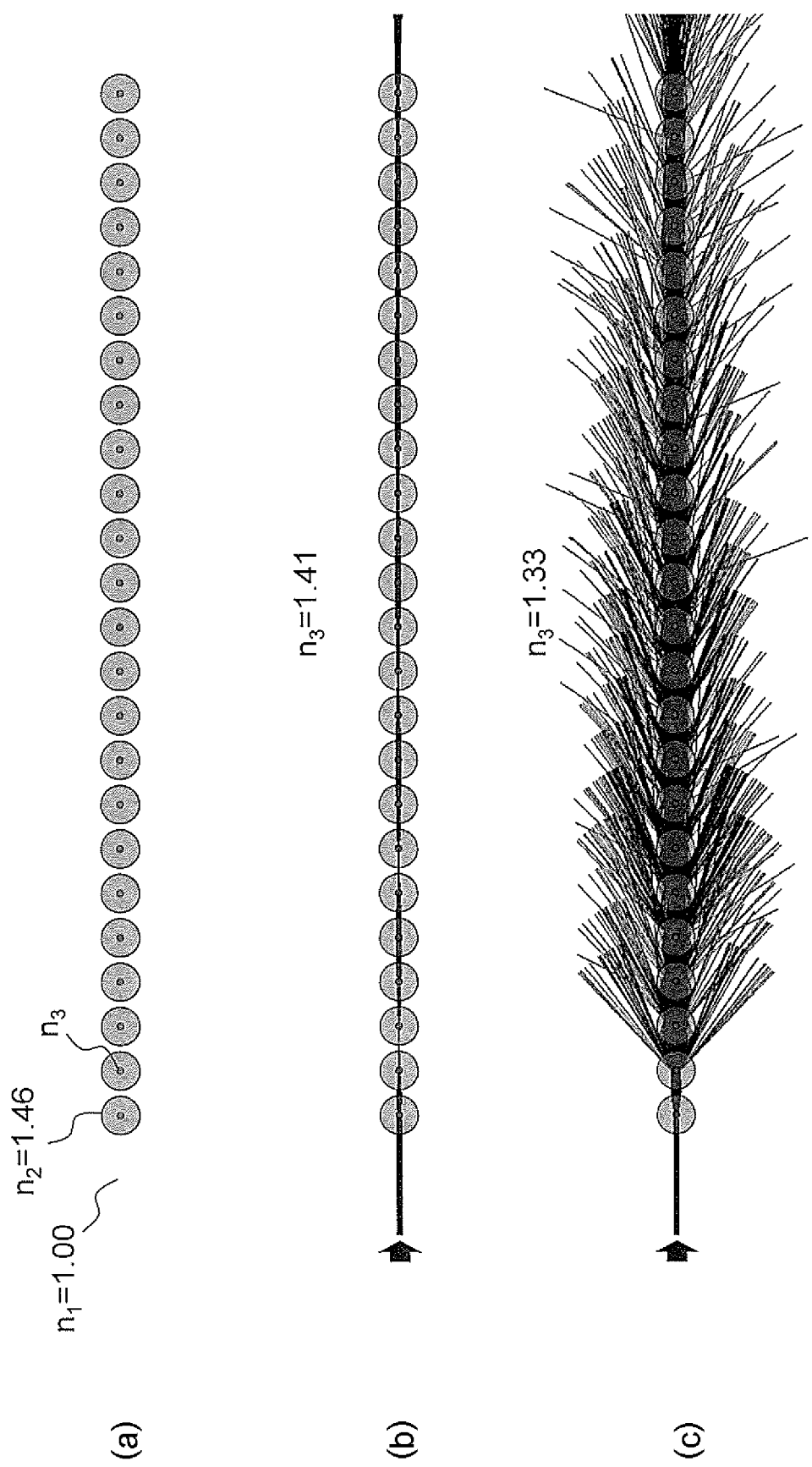
FIG. 4 is a diagram illustrating a configuration of a capillary array based on PTL 1 and laser-beam ray-tracing results.

FIG. 4(a) is a cross-sectional diagram illustrating a configuration of a capillary array of the 3500 Series Genetic Analyzer based on PTL 1. The laser-irradiation portions of 24 capillaries having an outer diameter 2R=323 µm and an inner diameter 2r=50 µm are arranged on the same plane at an interval of 370 µm. The outside of the capillaries is air having a refractive index $n_1$=1.00. The material of the capillaries is quartz glass having a refractive index $n_2$=1.46.

FIG. 4(b) is a diagram showing the results of laser-beam ray tracing, under the above conditions, when the one-side irradiation with a laser beam having a diameter of 50 µm is performed from the left side and the insides of the capillaries hold a separation medium having a high refractive index $n_3$=1.41. Since the multiple laser-beam focusing clearly functions, the insides of all the 24 capillaries can be efficiently irradiated. This corresponds to the fact that $\Delta\theta$=−1.3° is obtained according to Formula (1), and thus each capillary exhibits the convex lens effect.

On the other hand, FIG. 4(c) is a diagram showing the results of laser-beam ray tracing, under the above conditions in a case where the insides of the capillaries hold a separation medium having a low refractive index $n_3$=1.33. Since the multiple laser-beam focusing clearly does not function, the laser beam diverges from the capillary array and cannot efficiently irradiate the entire capillary array. This corresponds to the fact that $\Delta\theta$=+1.3° is obtained according to Formula (1), and thus each capillary exhibits the concave lens effect.

<Relative Fluorescence Intensity Distribution in Conventional Capillary Array Configuration (PTL 1)>

FIG. 5(a) is a diagram showing relative fluorescence intensity of each capillary in the capillary array with the both-side irradiation. The results in FIG. 5(a) were obtained by transforming the results with the one-side irradiation in FIGS. 4(b) and (c). The capillary numbers from 1 to 24 are sequentially given to each capillary from left to right. The relative fluorescence intensity is fluorescence intensity calculated from the irradiation intensity at each capillary by taking the reflection loss of the laser beam into consideration under the assumption that a constant concentration of a fluorophore exists in the laser-irradiation portion of each capillary. The fluorescence intensity expected when the laser beam oscillated from the laser source irradiates the inside of one capillary at full intensity is assumed to be 1. In the calculation for the both-side irradiation, it was assumed that the laser beam is irradiated to the capillary array from both sides thereof at half the full intensity. The graphs correspond to the laser-irradiation intensity at each capillary expressed by Formula (2) and Formula (4). However, while Formula (2) and Formula (4) are approximate equations which assume that the incident angle of the laser beam on interfaces between different media is 0°, the graphs show the results calculated based on the actual incident angles obtained by the laser-beam ray tracing and are thus more accurate. Subsequent similar graphs shown in FIGS. 7(a), 9, 11, 13, 15, 17, 19, and 20 are also more accurate results calculated based on the actual incident angles. In the case of $n_3$=1.41 in FIG. 5(a), the minimum value of the relative fluorescence intensity in the 24 capillaries is MIN=0.42, and the coefficient of variation (=standard deviation of relative fluorescence intensities/mean value of relative fluorescence intensities) is CV=11%, whereby it is found that MIN≥0.2, CV≤20%, and CV≤15% for the practical performances are satisfied. The distribution of the relative fluorescence intensity with respect to the capillary number is convex downward, since the intensity of the laser beam is attenuated as the laser beam travels through the capillary array due to the reflection loss of the laser beam, despite the fact that the multiple laser-beam focusing is functioning. On the other hand, in the case of $n_3$=1.33, MIN=0.068 and CV=74% are obtained, indicating that none of the requirements for the practical performances are satisfied.

FIG. 5(b) is a diagram showing the relative fluorescence intensity of each capillary when the vignetting effect of the optical system of the 3500 Series Genetic Analyzer is considered. The results in FIG. 5(b) were obtained by multiplying the results in FIG. 5(a) by optical-system-correction coefficients based on the vignetting effect. In the case of $n_3$=1.41, the convex downward distribution of the relative fluorescence intensities in FIG. 5(a) is canceled by the distribution of the optical-system-correction coefficients, and thus the distribution of the relative fluorescence intensities with the optical-system correction becomes flat as shown in FIG. 5(b). As a result, the minimum value MIN=0.42 of the fluorescence intensity did not change, but the coefficient of variation was significantly decreased to CV=0.76%. As a matter of course, all requirements for the practical performances were satisfied. On the other hand, in the case of $n_3$=1.33, since MIN=0.066 and CV=61% are obtained, which were not significantly changed, the requirements for the practical performances were still not satisfied.

<Configuration Example of Capillary Array According to First Embodiment>

FIG. 6(a) is a cross-sectional diagram illustrating a configuration example of a capillary array based on a first embodiment. The laser-irradiation portions of 24 capillaries having an outer diameter 2R=126 μm and an inner diameter 2r=50 μm are arranged on the same plane at an interval of 155 μm. An outside of the capillaries is air having a refractive index $n_1$=1.00. A material of the capillaries is quartz glass having a refractive index $n_2$=1.46.

FIG. 6(b) is a diagram showing the results of laser-beam ray tracing, under the above conditions, when the one-side irradiation with a laser beam having a diameter of 50 μm was performed from the left side in a case where insides of the capillaries were a separation medium having a high refractive index $n_3$=1.41. The multiple laser-beam focusing clearly functions, and the insides of all the 24 capillaries can be efficiently irradiated. This corresponds to the fact that Δθ=−5.8° is obtained according to Formula (1), and thus each capillary exhibits the convex lens effect.

On the other hand, FIG. 6(c) is a diagram showing the results of laser-beam ray tracing, under the above conditions, in a case where the insides of the capillaries hold a separation medium having a low refractive index $n_3$=1.33. The multiple laser-beam focusing clearly functions, and the insides of all the 24 capillaries can be efficiently irradiated in this case as well. This corresponds to the fact that Δθ=−3.2° is obtained according to Formula (1), and thus each capillary exhibits the convex lens effect. As described above, allowing each capillary to exhibit the convex lens effect and the multiple laser-beam focusing to function in both a separation medium having a high refractive index ($n_3$≥1.36) and a separation medium having a low refractive index ($n_3$<1.36), which cannot be realized by any of the known examples, is realized for the first time by the technique of the present disclosure. That is, in the capillary-array-electrophoresis apparatus of the present embodiment, the multiple laser-beam focusing functions in both of the first analysis mode having $n_3$<1.36 and the second analysis mode having $n_3$≥1.36.

<Relative Fluorescence Intensity Distribution According to Capillary Array Configuration of First Embodiment (FIG. 6)>

FIG. 7(a) is a diagram showing relative fluorescence intensity of each capillary in the capillary array with the both-side irradiation. The results in FIG. 7(a) were obtained by transforming the results with the one-side irradiation in FIGS. 6(b) and (c). In the case of $n_3$=1.41 in FIG. 7(a), the minimum value of the relative fluorescence intensity in the 24 capillaries is MIN=0.42, and the coefficient of variation is CV=11%, whereby it is found that MIN≥0.2, CV≤20%, and CV≤15% for the practical performances are satisfied. Similarly, in the case of $n_3$=1.33, since MIN=0.40 and CV=12% are obtained, the practical performances are thus satisfied as well.

FIG. 7(b) is a diagram showing the relative fluorescence intensity of each capillary when the vignetting effect of the optical system of the 3500 Series Gehetic Analyzer is considered. The results in FIG. 7(b) were obtained by multiplying the results in FIG. 7(a) by optical-system-correction coefficients based on the vignetting effect. As a result of the optical-system correction, MIN=0.42 and CV=9.0% are obtained in the case of $n_3$=1.41, and MIN=0.40 and CV=10% are obtained in the case of $n_3$=1.33, thus satisfying the practical performances as well.

In FIG. 7, unlike in FIG. 5, the relative fluorescence intensity does not change much with or without the optical-system correction. This is because the total width of the capillary array in FIG. 6 (155 μm interval×(24 capillaries−1 capillary)=3.6 mm) is narrower than the total width of the capillary array in FIG. 4 (370 μm interval×(24 capillaries−1 capillary)=8.5 mm). In other words, the distance between each capillary and the optical axis is shorter, and thus the vignetting effect of the optical system is smaller in FIG. 6 than in FIG. 4.

Figure 6:
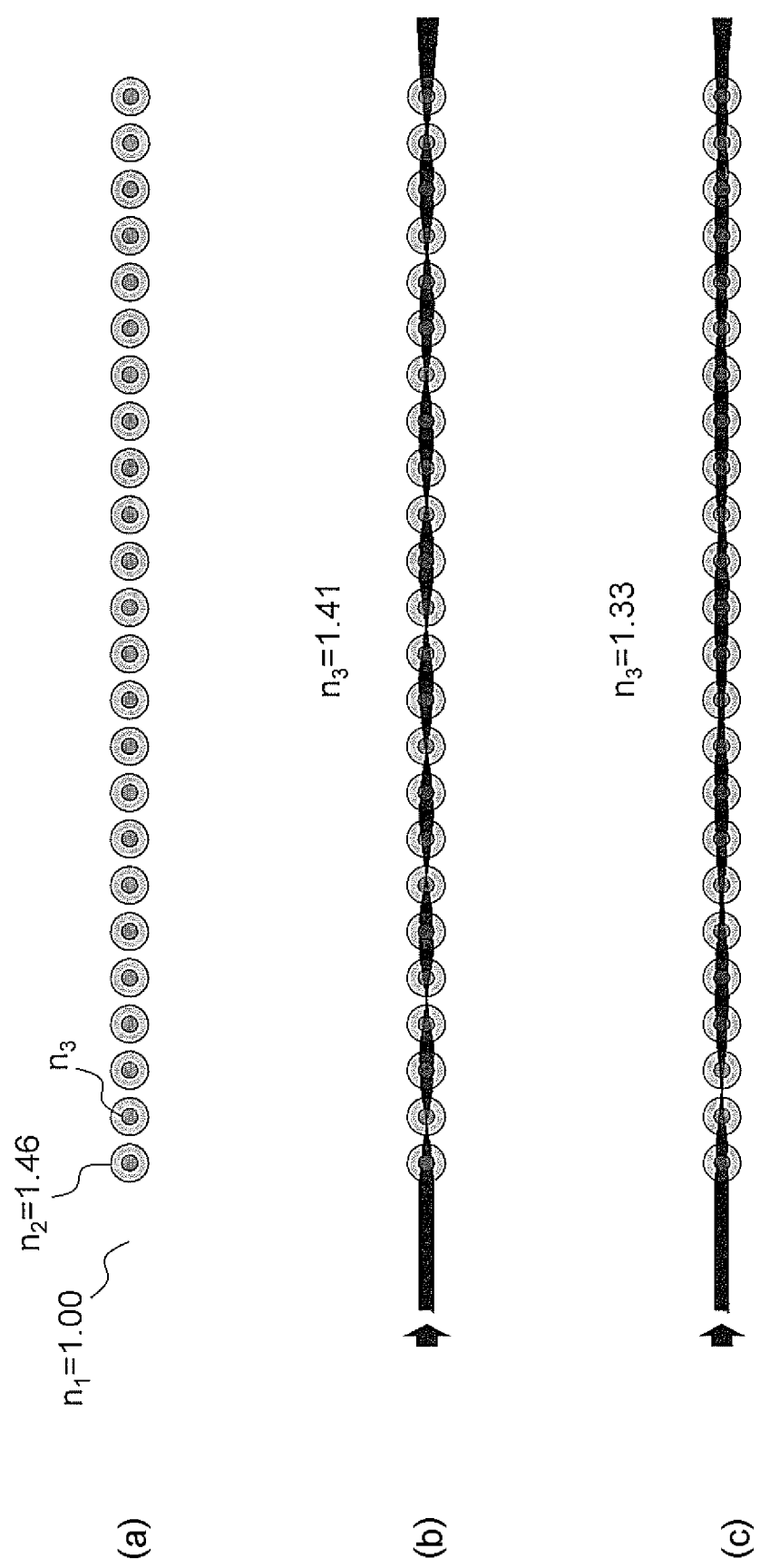
FIG. 6 is a diagram illustrating a configuration of a capillary array of the present disclosure and laser-beam ray-tracing results.

As a result, in the case of $n_3$=1.41 in the capillary array of the present embodiment shown in FIG. 6, CV=11% is slightly reduced to CV=9% by the optical-system correction due to the vignetting effect of the optical system. On the contrary, in the case of $n_3$=1.41 in the capillary array of the 3500 Series Genetic Analyzer shown in FIG. 4, CV=11% is greatly reduced to CV=0.76% by the optical-system correction due to the vignetting effect of the optical system. Similarly, CV=12% is slightly reduced to CV=10% by the optical-system correction due to the vignetting effect of the optical system in the case of $n_3$=1.33 in the capillary array of the present embodiment.

Conclusion of First Embodiment

As described above, it has become clear that each capillary exhibits the convex lens effect, and the multiple laser-beam focusing functions in the configuration of the first embodiment in the case of using a separation medium having any refractive index within the range of $n_3$≥1.33, including $n_3$=1.41. Furthermore, as a modification example of the present configuration, even in the case of using an arbitrary capillary with R/r≤4.4, for example, an arbitrary capillary having an outer diameter 2R≤220 μm when the inner diameter is fixed at 2r=50 μm, it is possible to cause the multiple laser-beam focusing to function, since each capillary exhibits the convex lens effect under the condition of $n_3$≥1.33.

(C) Second Embodiment

In the first embodiment, the case where the outside of the capillaries is air (refractive index $n_1=1.00$) was described. In a second embodiment, a case where the outside of the capillaries is not air (refractive index $n_1 \neq 1.00$) will be described. Even in such a case, according to the technique of the present disclosure, each capillary exhibits the convex lens effect, and the multiple laser-beam focusing functions in the case of using a separation medium having any refractive index within the range of $n_3 \geq 1.33$, including $n_3=1.41$.

<Configuration Example of Conventional Capillary Array (PTL 2)>

Figure 8:
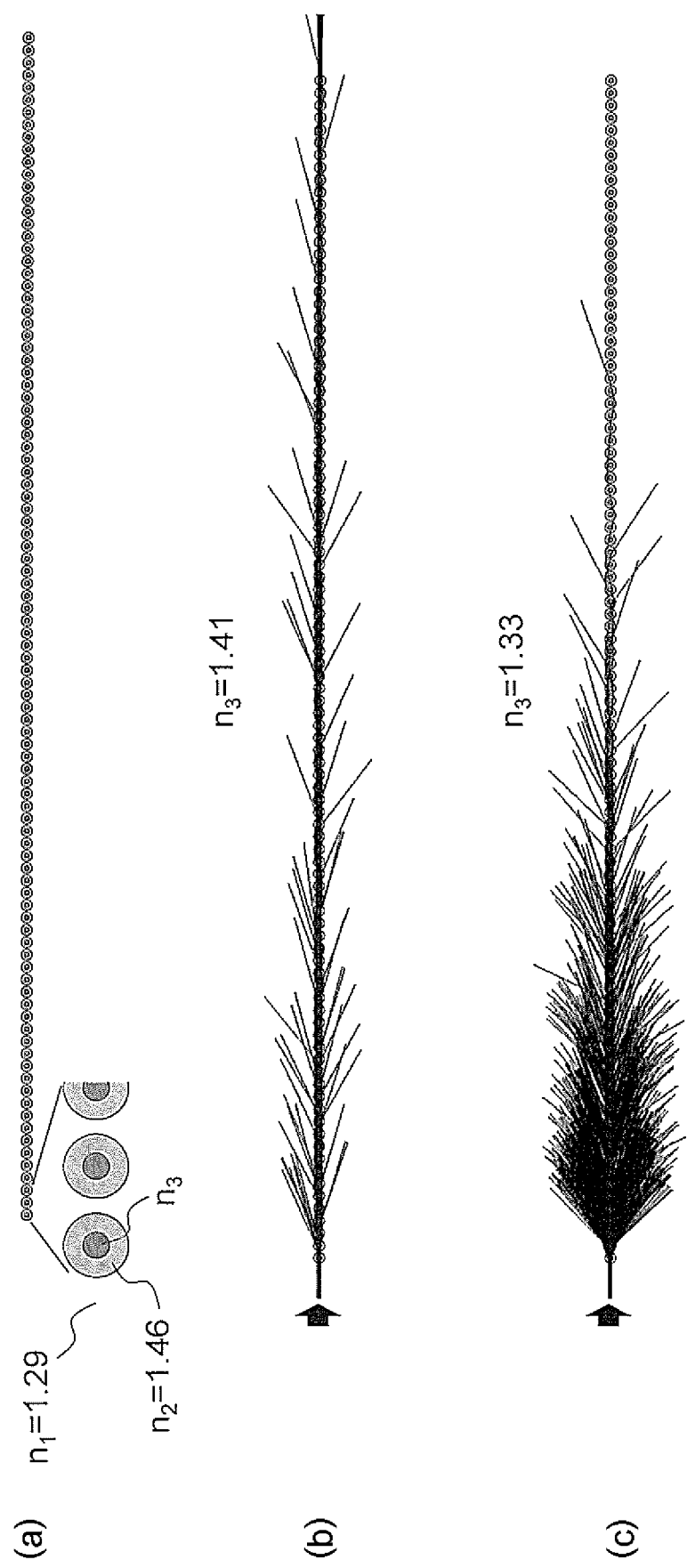
FIG. 8 is a diagram illustrating a configuration of a capillary array based on PTL 2 and laser-beam ray-tracing results.
Figure 9:
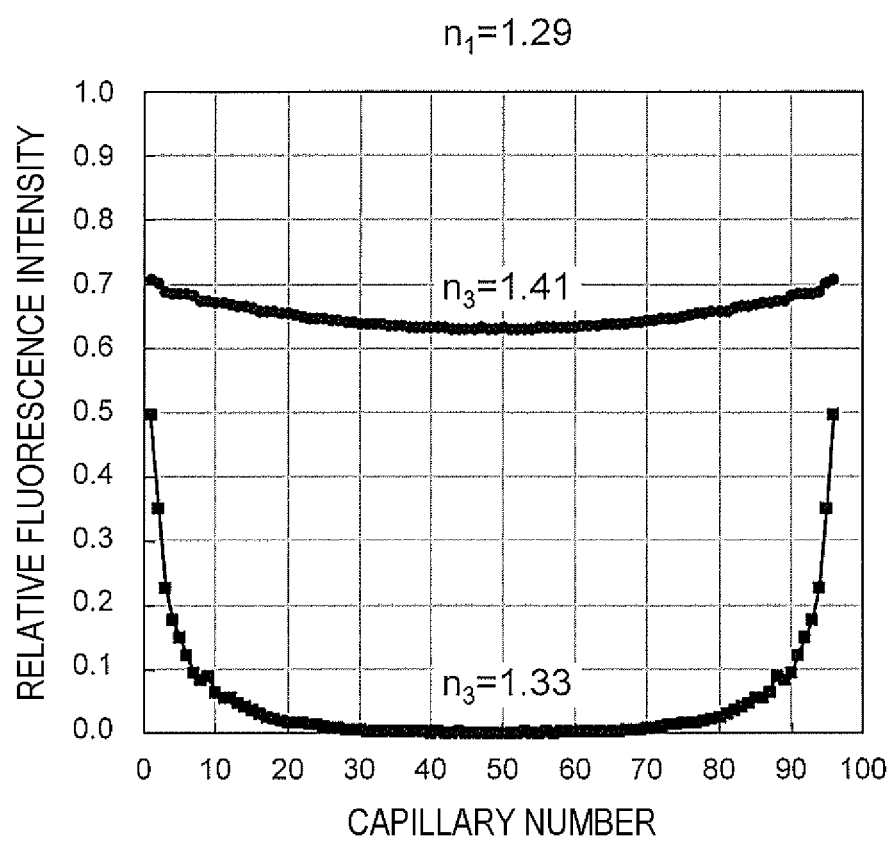
FIG. 9 is a diagram showing relative fluorescence intensity distributions in the capillary array based on PTL 2.

FIG. 8(a) is a cross-sectional diagram illustrating a configuration of a capillary array of the 3730 Series Genetic Analyzer based on PTL 2. The laser-irradiation portions of 96 capillaries having an outer diameter $2R=126$ μm and an inner diameter $2r=50$ μm are arranged on the same plane at an interval of 155 μm. An outside of the capillaries is a fluorine solution having a refractive index $n_1=1.29$ A material of the capillaries is quartz glass having a refractive index $n_2=1.46$.

FIG. 8(b) is a diagram showing the results of laser-beam ray tracing, under the above conditions, when the one-side irradiation with a laser beam having a diameter of 50 μm from the left side is performed and insides of the capillaries hold a separation medium having a high refractive index $n_3=1.41$. Since the multiple laser-beam focusing functions, the insides of all the 96 capillaries can be efficiently irradiated. This corresponds to the fact that $\Delta\theta=-0.69°$ is obtained according to Formula (1), and thus each capillary exhibits the convex lens effect.

On the other hand, FIG. 8(c) is a diagram showing the results of laser-beam ray tracing, under the above conditions, in a case where the insides of the capillaries hold a separation medium having a low refractive index $n_3=1.33$. Since the multiple laser-beam focusing does not function, the laser beam diverges from the capillary array and cannot efficiently irradiate the entire capillary array. This corresponds to the fact that $\Delta\theta=+2.9°$ is obtained according to Formula (1), and thus each capillary exhibits the concave lens effect.

<Relative Fluorescence Intensity Distribution According to Conventional Capillary Array Configuration (PTL 2)>

FIG. 9(a) is a diagram showing relative fluorescence intensity of each capillary in the capillary array with the both-side irradiation. The results in 9(a) were obtained by transforming the results with the one-side irradiation in FIGS. 8(b) and (c). In the case of $n_3=1.41$, the minimum value of the relative fluorescence intensity in the 96 capillaries is MIN=0.63, and the coefficient of variation is CV=3.2%, whereby it is found that MIN≥0.2, CV≤20%, and CV≤15% for the practical performances are satisfied. On the other hand, in the case of $n_3=1.33$, since MIN=0.00067 and CV=192%, it is found that that the requirements for the practical performances are not satisfied.

<Configuration Example of Conventional Capillary Array (NPL 1)>

Figure 10:
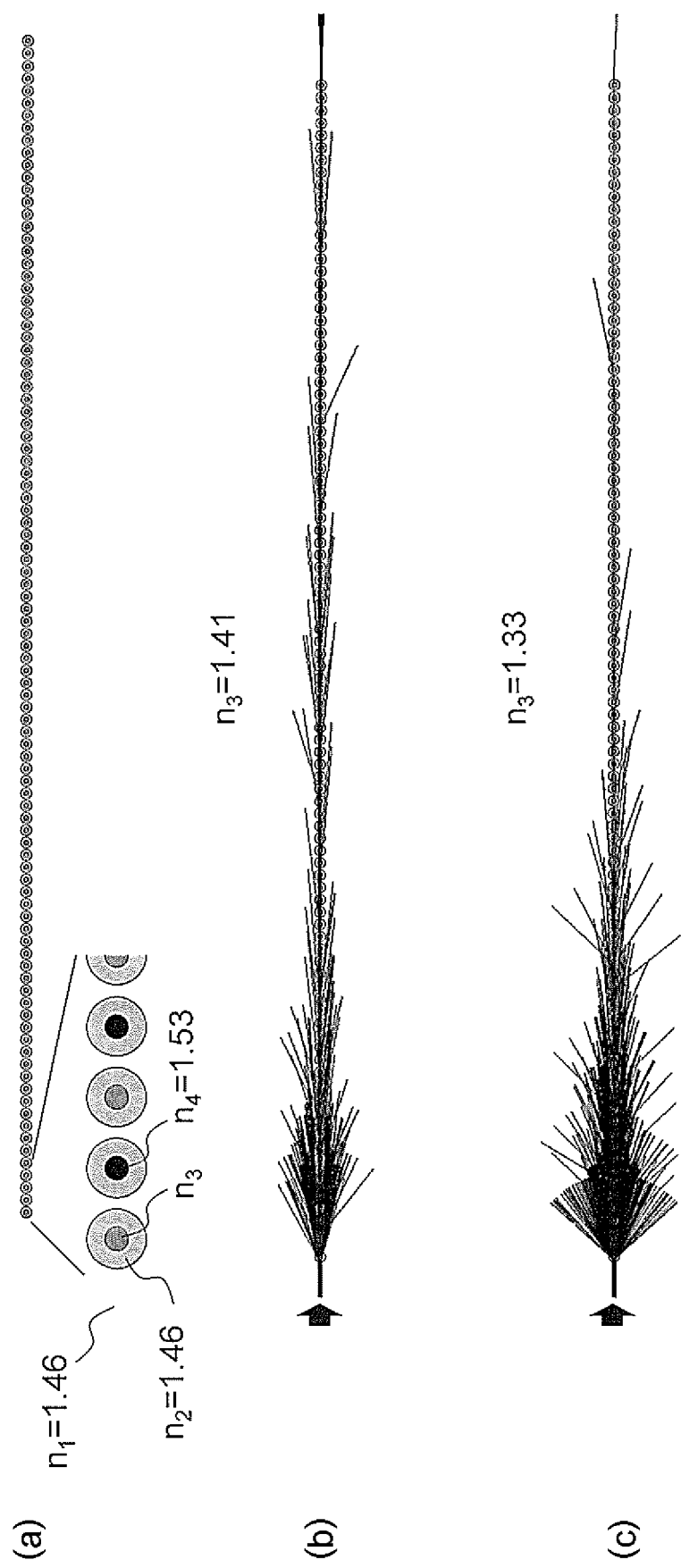
FIG. 10 is a diagram illustrating a configuration of a capillary array based on NPL 1 and laser-beam ray-tracing results.
Figure 11:
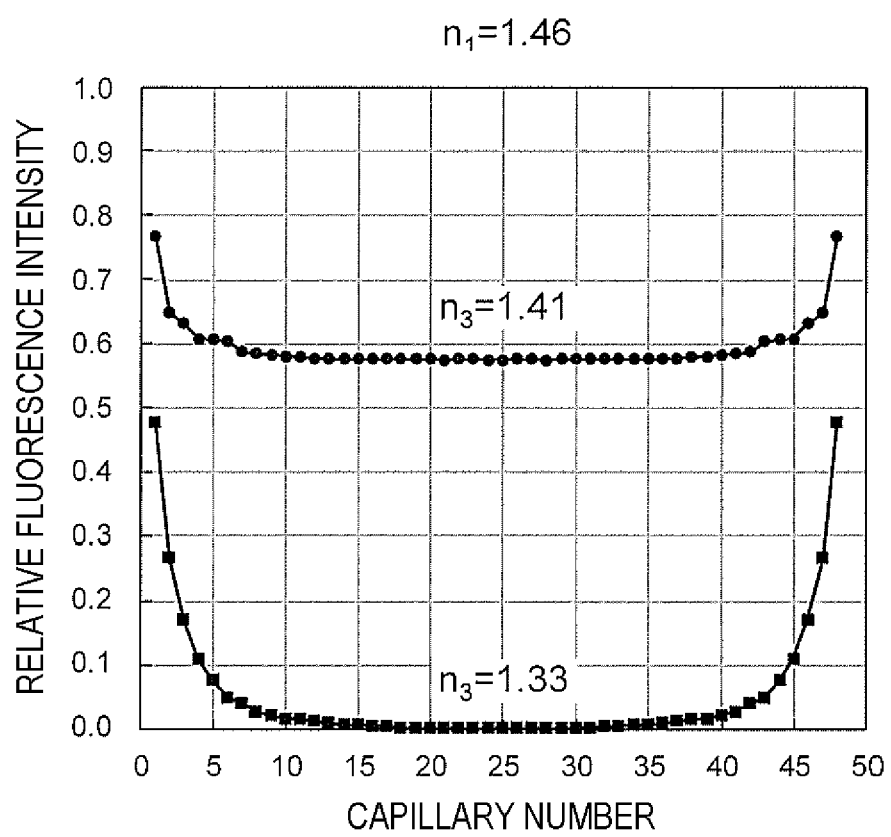
FIG. 11 is a diagram showing relative fluorescence intensity distributions in the capillary array based on NPL 1.

FIG. 10(a) is a cross-sectional diagram illustrating a configuration of a capillary array based on NPL 1. The laser-irradiation portions of 96 capillaries having an outer diameter $2R=126$ μm and an inner diameter $2r=50$ μm are arranged on the same plane at an interval of 155 μm. 48 analysis capillaries and 48 lens capillaries are alternately arranged in the capillary array. An outside of the capillaries is a matching solution having a refractive index $n_1=1.46$. A material of the capillaries is quartz glass having a refractive index $n_2=1.46$. A refractive index of a medium of insides of the lens capillaries is $n_4=1.53$.

FIG. 10(b) is a diagram showing the results of laser-beam ray tracing, under the above conditions, when the one-side irradiation with a laser beam having a diameter of 50 μm from the left side is performed in a case where the insides of the analysis capillaries hold a separation medium having a high refractive index $n_3=1.41$. Since the multiple laser-beam focusing functions, the insides of all the 96 capillaries can be efficiently irradiated. This is because, according to Formula (1), the refraction angle by one analysis capillary is $\Delta\theta_A=+2.4°$, while the refraction angle by one lens capillary is $\Delta\theta_B=-3.0°$, and thus $\Delta\theta_A+\Delta\theta_B=-0.6°$ is obtained. Therefore, one set of one analysis capillary and one lens capillary exhibits the convex lens effect, and the multiple laser-beam focusing functions.

On the other hand, FIG. 10(c) is a diagram showing the results of laser-beam ray tracing, under the above conditions, in a case where the insides of the analysis capillaries hold a separation medium having a low refractive index $n_3=1.33$. Since the multiple laser-beam focusing does not function, the laser beam diverges from the capillary array and cannot efficiently irradiate the entire capillary array. This is because, according to Formula (1), the refraction angle by one analysis capillary is $\Delta\theta_A=+6.60$, while the refraction angle by one lens capillary is $\Delta\theta_B=-3.0°$. Since $\Delta\theta_A+\Delta\theta_B=+3.6°$ is obtained, one set of one analysis capillary and one lens capillary exhibits the concave lens effect, and the multiple laser-beam focusing does not function.

<Relative Fluorescence Intensity Distribution According to Conventional Capillary Array Configuration (NPL 1)>

FIG. 11(a) is a diagram showing relative fluorescence intensity of each capillary in the capillary array with the both-side irradiation. The results in FIG. 11(a) were obtained by transforming the results with the one-side irradiation in FIGS. 10(b) and (c). In the case of $n_3=1.41$, the minimum value of the relative fluorescence intensity in the 48 analysis capillaries is MIN=0.58, and the coefficient of variation is CV=7%, whereby it is found that MIN≥0.2, CV≤20%, and CV≤15% for the practical performances are satisfied. On the other hand, in the case of $n_3=1.33$, MIN=0.00247 and CV=193% are obtained, whereby it is found that that the requirements for the practical performances are not satisfied.

<Configuration Example of Conventional Capillary Array (PTL 3)>

Figure 12:
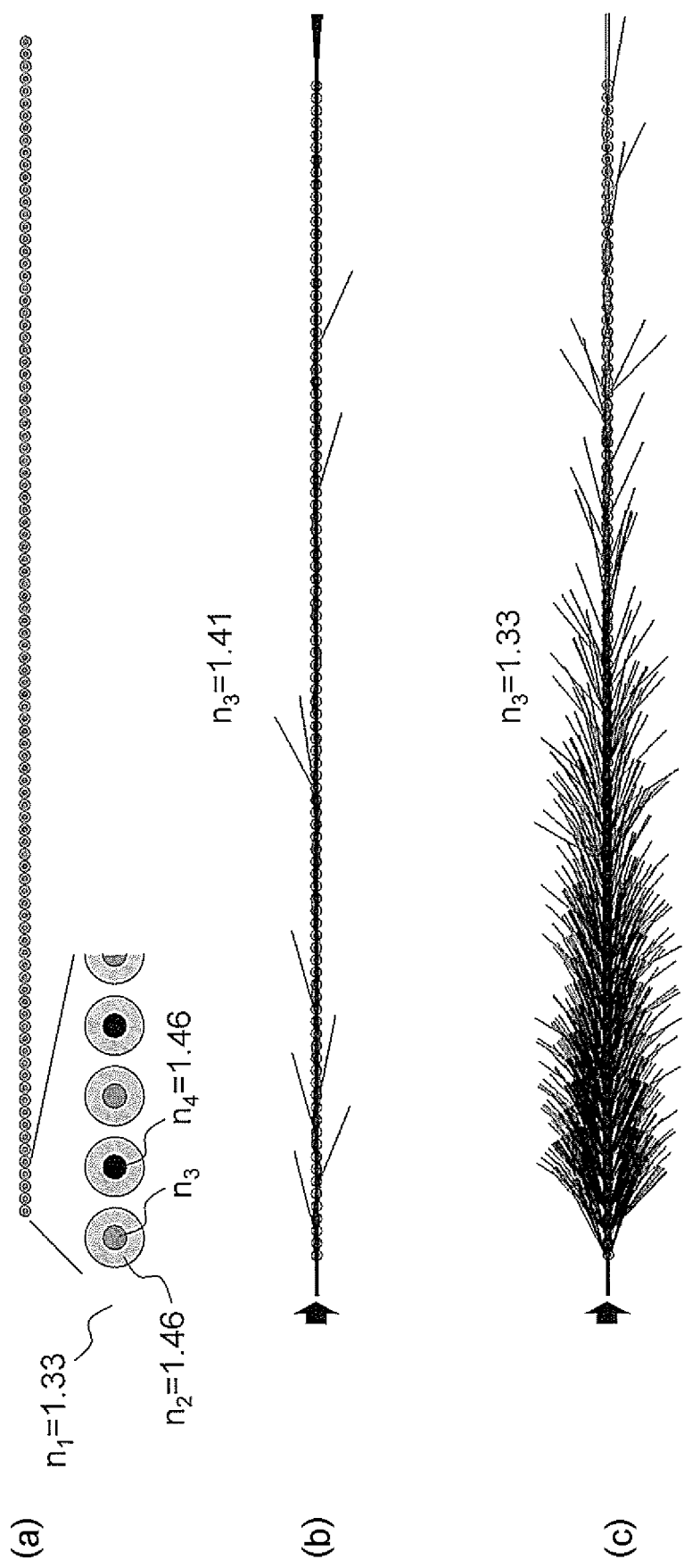
FIG. 12 is a diagram illustrating a configuration of a capillary array based on PTL 3 and laser-beam ray-tracing results.

FIG. 12(a) is a cross-sectional diagram illustrating a configuration example of a capillary array based on PTL 3. The laser-irradiation portions of 96 capillaries having an outer diameter $2R=126$ μm and an inner diameter $2r=50$ μm are arranged on the same plane at an interval of 155 μm. 48 analysis capillaries and 48 lens capillaries are alternately arranged in the capillary array. An outside of the capillaries is water having a refractive index $n_1=1.33$. A material of the capillaries is quartz glass having a refractive index $n_2=1.46$. A refractive index of a medium of insides of the lens capillaries is $n_4=1.53$.

FIG. 12(b) is a diagram showing the results of laser-beam ray tracing, under the above conditions, when the one-side irradiation with a laser beam having a diameter of 50 μm from the left side is performed in a case where insides of the analysis capillaries hold a separation medium having a high refractive index $n_3=1.41$. Since the multiple laser-beam focusing functions, the insides of all the 96 capillaries can be efficiently irradiated. This is because, according to Formula (1), the refraction angle by one analysis capillary is $\Delta\theta_A=+0.03°$, while the refraction angle by one lens capillary is $\Delta\theta_B=-2.1°$, and thus $\Delta\theta_A+\Delta\theta_B=-2.07°$ is obtained. Therefore, one set of one analysis capillary and one lens capillary exhibits the convex lens effect, and the multiple laser-beam focusing functions.

On the other hand, FIG. 12(c) is a diagram showing the results of laser-beam ray tracing, under the above conditions, in a case where the insides of the analysis capillaries hold a separation medium having a low refractive index $n_3=1.33$. Since the multiple laser-beam focusing does not function, the laser beam diverges from the capillary array and cannot efficiently irradiate the entire capillary array. This is because, according to Formula (1), the refraction angle by one analysis capillary is $\Delta\theta_A=+3.7$, while the refraction angle by one lens capillary is $\Delta\theta_B=-2.1°$, and thus $\Delta\theta_A+\Delta\theta_B=+1.6°$ is obtained. Thus, one set of one analysis capillary and one lens capillary exhibits the concave lens effect, and the multiple laser-beam focusing does not function. Therefore, a plurality of capillaries cannot be simultaneously irradiated with a laser beam in the case of using a separation medium having a low refractive index.

<Relative Fluorescence Intensity Distribution According to Conventional Capillary Array Configuration (FIG. 12)>

Figure 13:
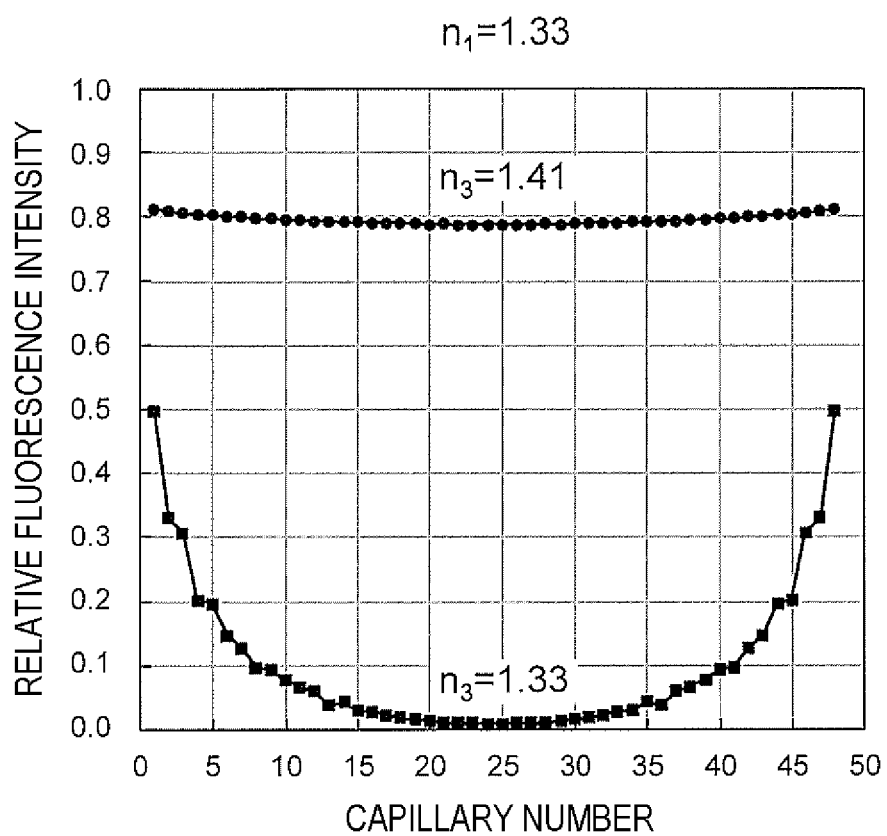
FIG. 13 is a diagram showing relative fluorescence intensity distributions in the capillary array based on PTL 3.

FIG. 13 is a diagram showing relative fluorescence intensity of each capillary in the capillary array with the both-side irradiation. The results in FIG. 13 were obtained by transforming the results with the one-side irradiation in FIGS. 12(b) and (c). In the case of $n_3=1.41$, the minimum value of the relative fluorescence intensity in the 48 analysis capillaries is MIN=0.79, and the coefficient of variation is CV=1%, whereby it is found that MIN≥0.2, CV≤20%, and CV≤15% for the practical performances are satisfied. On the other hand, in the case of $n_3=1.33$, MIN=0.00975 and CV=119% are obtained, whereby it is found that that the requirements for the practical performances are not satisfied.

<Configuration Example of Capillary Array According to Second Embodiment>

FIG. 14(a) is a cross-sectional diagram illustrating a configuration example of a capillary array of the second embodiment. The laser-irradiation portions of 96 capillaries having an outer diameter 2R=126 μm and an inner diameter 2r=50 μm are arranged on the same plane at an interval of 155 μm. 48 analysis capillaries and 48 lens capillaries are alternately arranged in the capillary array. An outside of the capillaries is a fluorine solution having a refractive index $n_1=1.29$. A material of the capillaries is quartz glass having a refractive index $n_2=1.46$. A refractive index of a medium of insides of the lens capillaries is $n_4=1.46$. Since $n_2=n_4=1.46$, rod lenses having an outer diameter 2R=126 μm and a refractive index of 1.46 may be used instead of the lens capillaries. However, it is usually difficult to match the outer diameter of the capillary and the outer diameter of the rod lens. On the other hand, it is easier to match the outer diameters of both the analysis capillary and the lens capillary by using capillaries having the same specification and the same lot for both the analysis capillary and the lens capillary.

FIG. 14(b) is a diagram showing the results of laser-beam ray tracing, under the above conditions, when the one-side irradiation with a laser beam having a diameter of 50 μm from the left side is performed in a case where the insides of the analysis capillaries hold a separation medium having a high refractive index $n_3=1.41$. Since the multiple laser-beam focusing functions, the insides of all the 96 capillaries can be efficiently irradiated. This is because, according to Formula (1), the refraction angle by one analysis capillary is $\Delta\theta_A=-0.7°$, while the refraction angle by one lens capillary is $\Delta\theta_B=-2.7°$, and thus $\Delta\theta_A+\Delta\theta_B=-3.4°$ is obtained. Therefore, one set of one analysis capillary and one lens capillary exhibits the convex lens effect, and the multiple laser-beam focusing functions.

On the other hand, FIG. 14(c) is a diagram showing the results of laser-beam ray tracing, under the above conditions, in a case where the insides of the analysis capillaries hold a separation medium having a low refractive index $n_3=1.33$. Although the multiple laser-beam focusing functions, since the laser beam slightly diverges from the capillary array, the entire capillary array cannot be irradiated very efficiently. This is because, according to Formula (1), the refraction angle by one analysis capillary is $\Delta\theta_A=+2.9°$, while the refraction angle by one lens capillary is $\Delta\theta_B=-2.7°$, and thus $\Delta\theta_A+\Delta\theta_B=+0.2°$ is obtained. Therefore, one set of one analysis capillary and one lens capillary slightly exhibits the concave lens effect, and the multiple laser-beam focusing function is deteriorated. However, it is possible to simultaneously irradiate each capillary with high efficiency, compared to the results obtained by the conventional methods shown in FIGS. 10(c) and 12(c).

<Relative Fluorescence Intensity Distribution According to Capillary Array Configuration of Second Embodiment (FIG. 14)>

Figure 14:
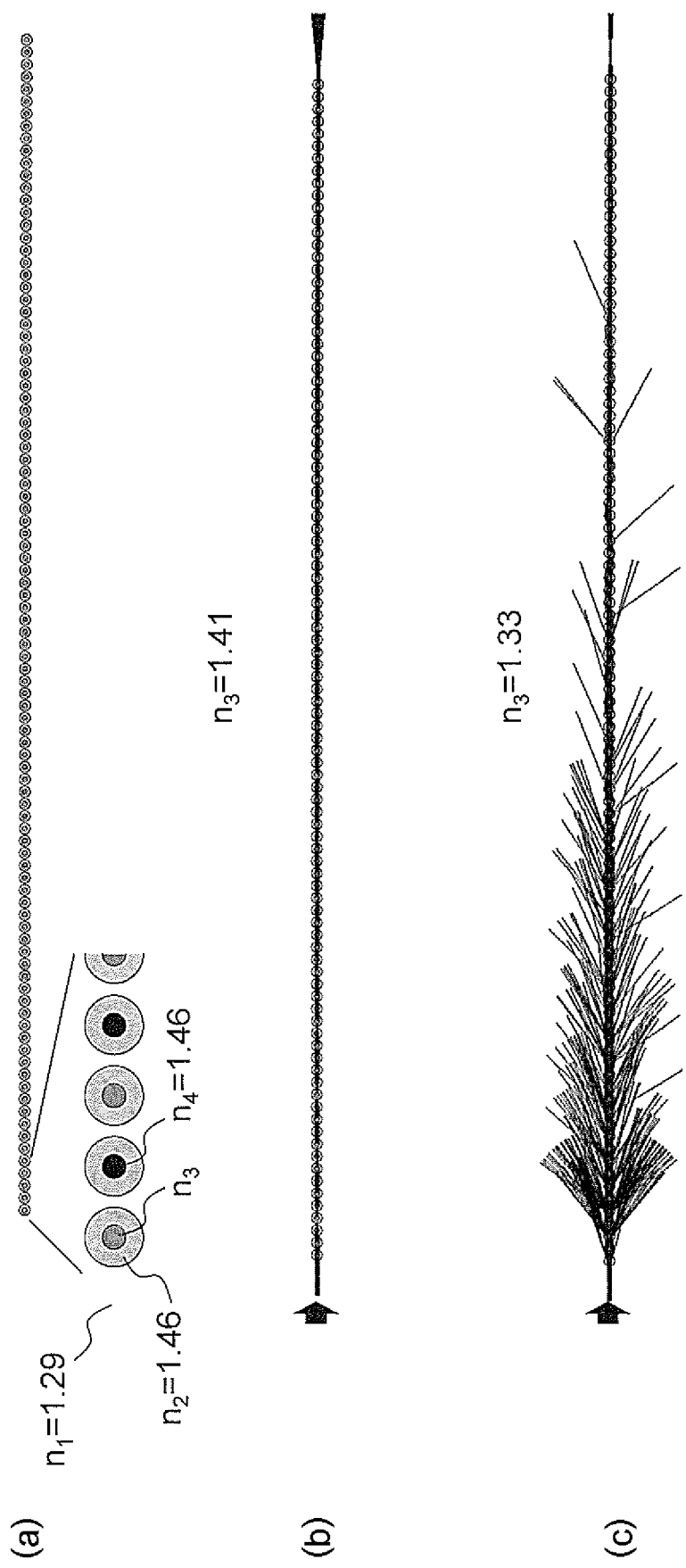
FIG. 14 is a diagram illustrating a configuration of a capillary array of the present disclosure and laser-beam ray-tracing results.
Figure 15:
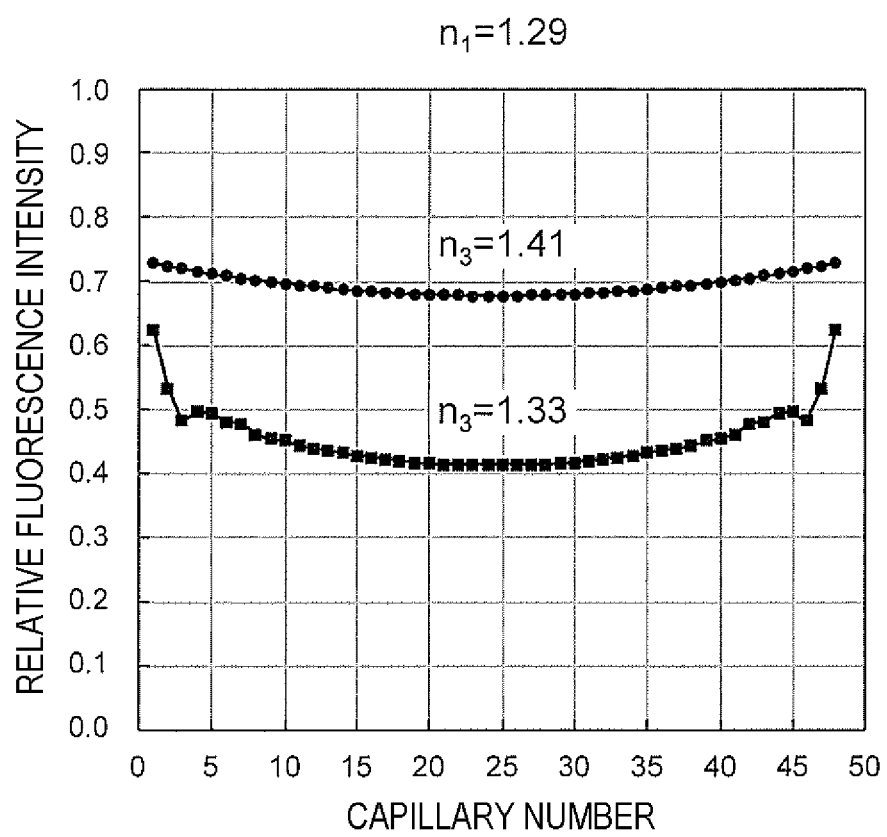
FIG. 15 is a diagram showing relative fluorescence intensity distributions in the capillary array of the present disclosure.

FIG. 15 is a diagram showing relative fluorescence intensity of each capillary in the capillary array with the both-side irradiation. The results in FIG. 15 were obtained by transforming the results with the one-side irradiation in FIGS. 14(b) and (c). In the case of $n_3=1.41$, the minimum value of the relative fluorescence intensity in the 48 analysis capillaries is MIN=0.68, and the coefficient of variation is CV=2%, whereby it is found that MIN≥0.2, CV≤20%, and CV≤15% for the practical performances are satisfied. On the other hand, in the case of $n_3=1.33$, MIN=0.42 and CV=11% is obtained, whereby it is found that that MIN≥0.2 and CV≤20% are satisfied, whereas CV≤15% is not satisfied. Therefore, a method of simultaneously irradiating 48 or more analysis capillaries with a laser beam with higher efficiency is proposed next.

<Another Configuration Example of Capillary Array According to Second Embodiment>

FIG. 16(a) is a cross-sectional diagram illustrating a configuration example of the capillary array of the second embodiment. The laser-irradiation portions of 96 capillaries having an outer diameter 2R=126 μm and an inner diameter 2r=50 μm are arranged on the same plane at an interval of 155 μm. 48 analysis capillaries and 48 lens capillaries are alternately arranged in the capillary array. An outside of the capillaries is a fluorine solution having a refractive index $n_1=0.1.25$. A material of the capillaries is quartz glass having a refractive index $n_2=1.46$. The specifications of the fluorine solution having the refractive index $n_1=1.25$ are different from those of the fluorine solution having the refractive index $n_1=1.29$, which is used in FIGS. 8 and 14, and are not adopted in the known techniques. Although reducing the refractive index of the outside of the capillaries can enhance the convex lens effect of each capillary, it also increases the reflection loss of the laser beam at the same time. Therefore, it is unclear whether the reduction of the refractive index of the outside of the capillaries is effective for the simultaneous irradiation of 48 or more analysis capillaries. The fluorine solution having a refractive index $n_1=1.25$ can be, for example, Fluorinert (registered trademark) commercially available from 3M. The refractive index of a medium of the insides of the lens capillaries is $n_4=1.46$.

FIG. 16(b) is a diagram showing the results of laser-beam ray tracing, under the above conditions, when the one-side irradiation with a laser beam having a diameter of 50 μm from the left side is performed in a case where the insides of the analysis capillaries hold a separation medium having a high refractive index $n_3=1.41$. Since the multiple laser-beam focusing functions, the insides of all the 96 capillaries can be efficiently irradiated. This is because, according to Formula (1), the refraction angle by one analysis capillary is $\Delta\theta_A=-1.4°$, while the refraction angle by one lens capillary is $\Delta\theta_B=3.3°$, and thus $\Delta\theta_A+\Delta\theta_B=-4.7°$ is obtained. Therefore, one set of one analysis capillary and one lens capillary exhibits the convex lens effect, and the multiple laser-beam focusing functions.

Figure 16:
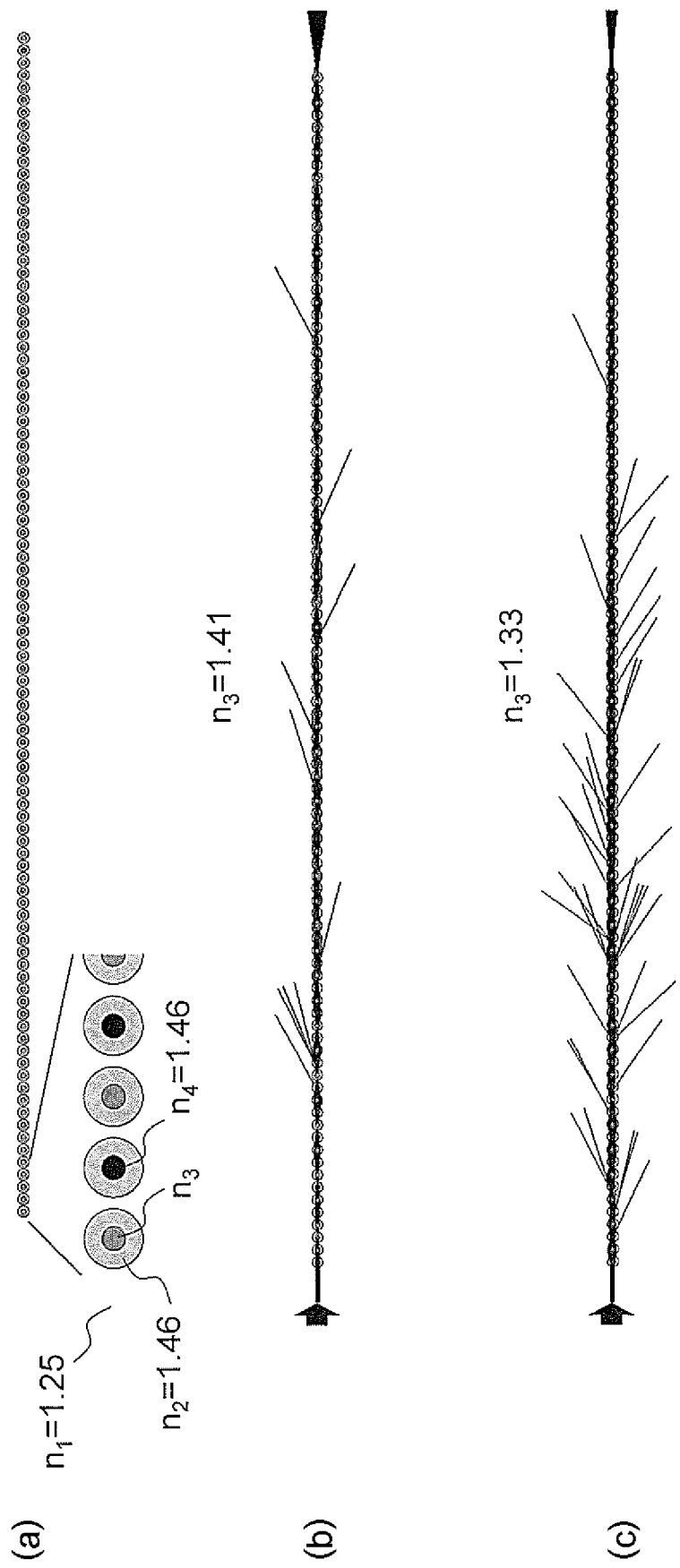
FIG. 16 is a diagram illustrating a configuration of a capillary array of the present disclosure and laser-beam ray-tracing results.

On the other hand, FIG. 16(c) is a diagram showing the results of laser-beam ray tracing, under the above conditions, in a case where the insides of the analysis capillaries hold a separation medium having a low refractive index $n_3=1.33$. The multiple laser-beam focusing functions, and the insides of all the 96 capillaries can be efficiently irradiated. This is because, according to Formula (1), the refraction angle by one analysis capillary is $\Delta\theta_A=+2.0°$, while the refraction angle by one lens capillary is $\Delta\theta_B=3.3°$, and thus $\Delta\theta_A+\Delta\theta_B=-1.3°$ is obtained. Therefore, one set of one analysis capillary and one lens capillary exhibits the convex lens effect, and the multiple laser-beam focusing functions.
<Relative Fluorescence Intensity Distribution According to Capillary Array Configuration of Second Embodiment (FIG. 16)>

Figure 17:
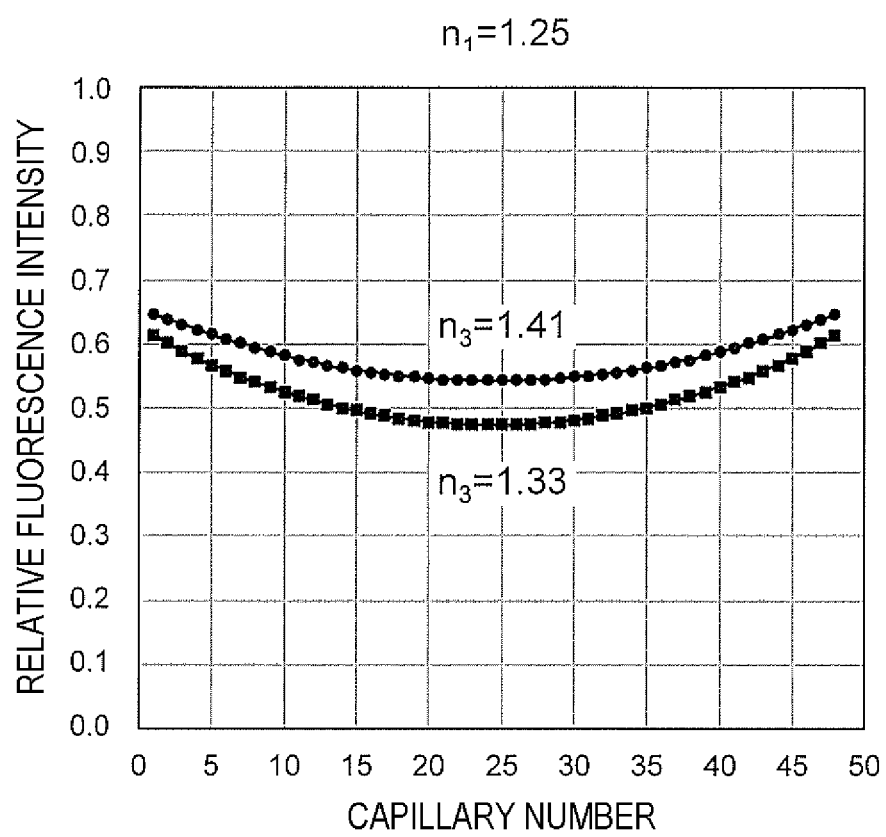
FIG. 17 is a diagram showing relative fluorescence intensity distributions in the capillary array of the present disclosure.

FIG. 17 is a diagram showing relative fluorescence intensity of each capillary in the capillary array with the both-side irradiation. The results in FIG. 17 were obtained by transforming the results with the one-side irradiation in FIGS. 16(b) and (c). In the case of $n_3=1.41$, the minimum value of the relative fluorescence intensity in the 48 analysis capillaries is MIN=0.54, and the coefficient of variation is CV=6%, whereby it is found that MIN≥0.2, CV≤20%, and CV≤15% for the practical performances are satisfied. On the other hand, in the case of $n_3=1.33$, MIN=0.47 and CV=8% is obtained, whereby it is found that that MIN≥0.2, CV≤20%, and CV≤15% are satisfied. In other words, the present configuration is a suitable method for simultaneously irradiating 48 or more analysis capillaries with a laser beam.
<Another Configuration Example of Capillary Array According to Second Embodiment>

FIG. 18(a) is a cross-sectional diagram of a configuration of a capillary array of the present embodiment. The laser-irradiation portions of 192 capillaries having an outer diameter $2R=126$ µm and an inner diameter $2r=50$ µm are arranged on the same plane at an interval of 155 µm. 96 analysis capillaries and 96 lens capillaries are alternately arranged in the capillary array. An outside of the capillaries is a fluorine solution having a refractive index $n_1=1.25$. A material of the capillaries is quartz glass having a refractive index $n_2=1.46$. A refractive index of a medium of insides of the lens capillaries is $n_4=1.46$.

FIG. 18(b) is a diagram showing the results of laser-beam ray tracing, under the above conditions, when the one-side irradiation with a laser beam having a diameter of 50 µm from the left side is performed in a case where the insides of the analysis capillaries hold a separation medium having a high refractive index $n_3=1.41$. Since the multiple laser-beam focusing functions, the insides of all the 192 capillaries can be efficiently irradiated. The refraction angle by each capillary is equivalent to that in the case of FIG. 16(b).

Figure 18:
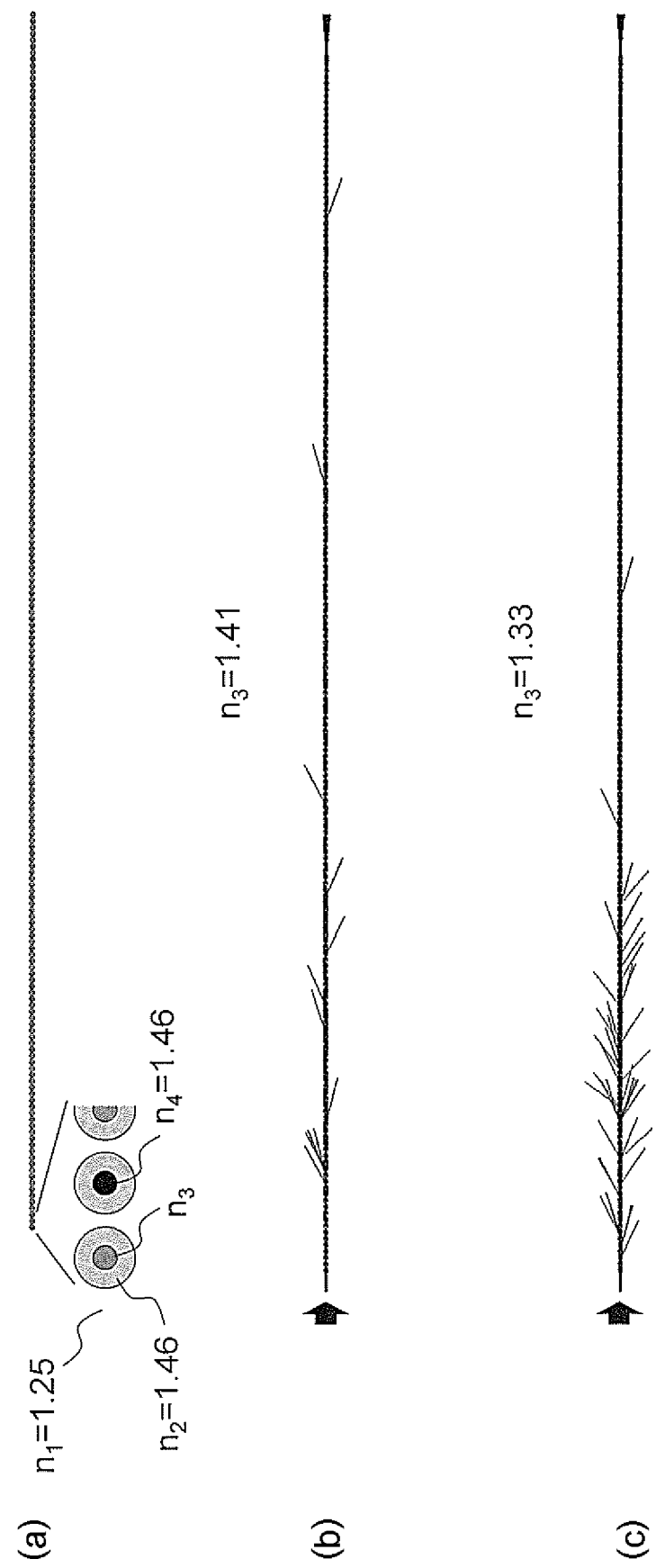
FIG. 18 is a diagram illustrating a configuration of a capillary array of the present disclosure and laser-beam ray-tracing results.

On the other hand, FIG. 18(c) is a diagram showing the results of laser-beam ray tracing, under the above conditions, in a case where the insides of the analysis capillaries hold a separation medium having a low refractive index $n_3=1.33$. The multiple laser-beam focusing functions, and the insides of all the 192 capillaries can be efficiently irradiated. The refraction angle by each capillary is equivalent to that in the case of FIG. 16(c).
<Relative Fluorescence Intensity Distribution According to Capillary Array Configuration of Second Embodiment (FIG. 18)>

Figure 19:
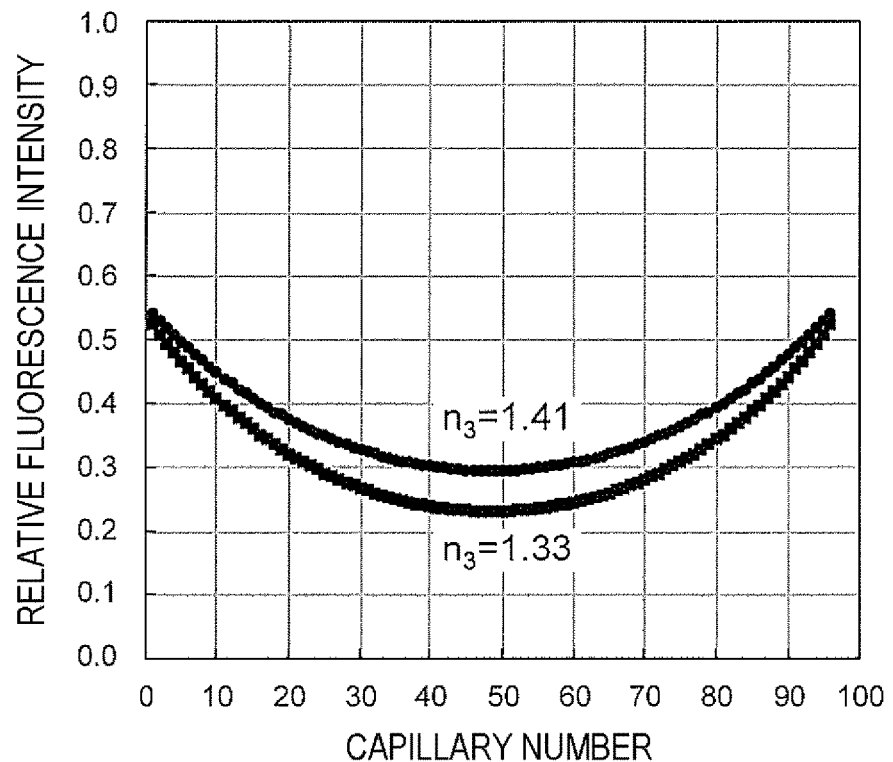
FIG. 19 is a diagram showing relative fluorescence intensity distributions in the capillary array of the present disclosure.
Figure 20:
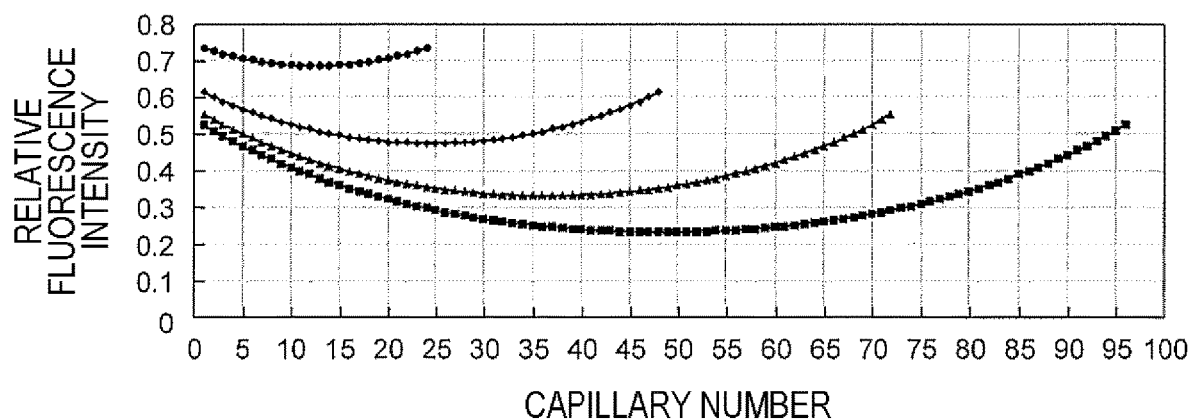
FIG. 20 is a diagram showing relative fluorescence intensity distributions of capillary arrays of the present disclosure.

FIG. 19 is a diagram showing relative fluorescence intensity of each capillary in the capillary array with the both-side irradiation. The results in FIG. 19 were obtained by transforming the results with the one-side irradiation in FIGS. 18(b) and (c). In the case of $n_3=1.41$, the minimum value of the relative fluorescence intensity in the 96 analysis capillaries is MIN=0.30, and the coefficient of variation is CV=20%, whereby it is found that MIN≥0.2 and CV≤20% for the practical performances are satisfied, whereas CV≤15% is not satisfied. On the other hand, in the case of $n_3=1.33$, MIN=0.23 and CV=27% are obtained, whereby it is found that that MIN≥0.2 and is satisfied, whereas CV≤20% and CV≤15% are not satisfied. However, the present configuration clearly provides a suitable method for simultaneously irradiating 96 or more analysis capillaries with a laser beam, compared to the case where $n_3=1.33$ in FIG. 9 (PTL 2).
<Change in Number of Capillaries>

Similarly to FIGS. 16 to 19, FIG. 20 is a diagram showing relative fluorescence intensity of each analysis capillary in capillary arrays where 24, 48, 72, or 96 analysis capillaries and 24, 48, 72, or 96 lens capillaries having an outer diameter $2R=126$ µm and an inner diameter $2r=50$ µm are arranged on the same plane at an interval of 155 µm, with the both-side irradiation. An outside of the capillaries is a fluorine solution having a refractive index $n_1=1.25$. A material of the capillaries is quartz glass having a refractive index $n_2=1.46$. Insides of the analysis capillaries hold a separation medium having a low refractive index $n_3=1.33$ A refractive index of a medium of insides of the lens capillaries is $n_4=1.46$. That is, in FIG. 20, the graph of the black rhomboid-shaped plots for the 48 analysis capillaries is the same as the graph for $n_3=1.33$ in FIG. 17. The graph of the black square plots for the 96 analysis capillaries is the same as the graph for $n_3=1.33$ in FIG. 19. As described above, it is understood that the configuration of the present embodiment is suitable for simultaneous irradiation of various numbers of analysis capillaries from 24 to 96 with a laser beam. Needless to say, the configuration of the present embodiment is also effective for 24 or less, or 96 or more analysis capillaries.

(D) Third Embodiment

In a third embodiment, the influence of the refractive index of the medium of the outside of the capillaries in the configuration of the capillary array of the second embodiment shown in FIG. 16 is evaluated. The laser-irradiation portions of the 96 capillaries having the outer diameter $2R=126$ µm and the inner diameter $2r=50$ µm are arranged on the same plane at the interval of 155 µm. The 48 analysis capillaries and the 48 lens capillaries are alternately arranged in the capillary array. The material of the capillaries is quartz glass having the refractive index $n_2=1.46$. The insides of the analysis capillaries hold a separation medium having a low refractive index $n_3=1.33$. The refractive index of the medium of the insides of the lens capillaries is $n_4=1.46$.

FIG. 21(a) shows relative fluorescence intensities of the 48 analysis capillaries against the refractive index $n_1$ of the outside of the capillaries from 1.20 to 1.33 under the above conditions, the maximum values thereof being indicated by black triangle plots, the mean values thereof being indicated by black circle plots, and the minimum value thereof being indicated by black square plots. It is understood from the results that MIN≥0.2 for the practical performance is satisfied in the case of $n_1 \leq 1.31$. Furthermore, higher performances, that is, MIN≥0.3 and MIN≥0.4 are satisfied when $n_1 \leq 1.30$ and 1.23 $n_1 \leq 1.29$, respectively.

FIG. 21(b) shows coefficient of variations of the relative fluorescence intensities of the 48 analysis capillaries against the refractive index $n_1$ of the outside of the capillaries from 1.20 to 1.33 under the same conditions as in FIG. 21(a). It is understood from the results that CV≤20% for the practical performance is satisfied in the case of $n_1 \leq 1.30$. Furthermore, it is understood that CV≤15% for the practical performance is satisfied in the case of $1.21 \leq n_1 \leq 1.29$. In addition, it is understood that CV≤10% is satisfied, indicating higher performance, in the case of $1.24 \leq n_1 \leq 1.28$.

$n_1 = 1.25$ in FIG. 16 is a condition under which CV≤10% is obtained, and MIN=0.47 and CV=8% are actually obtained as shown in FIG. 17. $n_1 = 1.29$ in FIG. 14 is a condition under which CV≤15% is obtained, whereas CV≤10% is not obtained, and MIN=0.42 and CV=11% are actually obtained as shown in FIG. 15. In other words, it is clear from FIG. 21 that $n_1 = 1.25$ is a more preferable condition than $n_1 = 1.29$. Overall, it is understood from the above that higher performance is obtained in the case of $1.24 \leq n_1 \leq 1.28$, and the highest performance is obtained in the case of $n_1 = 1.26$.

(E) Fourth Embodiment

In a fourth embodiment, the influences of the outer diameter of the capillaries and the ratio of the outer diameter to the inner diameter in the configuration of the capillary array of the second embodiment shown in FIG. 16 are evaluated. The laser-irradiation portions of the 96 capillaries having the inner diameter 2r=50 μm are arranged on the same plane. The 48 analysis capillaries and the 48 lens capillaries are alternately arranged in the capillary array. The outside of the capillaries is the fluorine solution having the refractive index $n_1 = 1.25$. The material of the capillaries is quartz glass having the refractive index $n_2 = 1.46$. The insides of the analysis capillaries hold the separation medium having the low refractive index $n_3 = 1.33$, and the insides of the lens capillaries hold the matching solution having the refractive index $n_4 = 1.46$.

FIG. 22(a) shows relative fluorescence intensities of the 48 analysis capillaries against the outer diameter 2R of the capillaries from 75 μm to 250 μm under the above conditions, the maximum values thereof being indicated by black triangle plots, the mean values thereof being indicated by black circle plots, and the minimum value thereof being indicated by black square plots. The interval in the capillary arrangement is a value obtained by adding 29 μm to the outer diameter 2R. It is understood from the results that MIN≥0.2 for the practical performance is satisfied in the case of the outer diameter 2R 190 μm. Furthermore, higher performances, that is, MIN≥0.3 and MIN≥0.4 are satisfied when 2R≤175 μm and 90 μm 2R 150 μm, respectively. In other words, it is understood that MIN≥0.2 for the practical performance is satisfied when the ratio of the outer diameter to the inner diameter R/r≤3.8. In addition, higher performances, that is, MIN≥0.3 and MIN≥0.4 are satisfied when R/r≤3.5 and 1.8≤R/r≤3.0, respectively.

FIG. 22(b) shows coefficient of variations of the relative fluorescence intensities of the 48 analysis capillaries against the outer diameter 2R of the capillaries from 75 μm to 250 μm under the same conditions as in FIG. 22(a). It is understood from the results that CV≤20% for the practical performance is satisfied when the outer diameter 2R 175 μm. Furthermore, it is understood that CV≤15% for the practical performance is satisfied when 85 μm 2R≤160 μm. In addition, it is understood that CV≤10% is satisfied, indicating higher performance, when 100 μm≤2R 140 μm. In other words, it is understood that CV≤20% for the practical performance is satisfied when the ratio of the outer diameter to the inner diameter R/r≤3.5. Moreover, it is understood that CV≤15% for the practical performance is satisfied when 1.7≤R/r≤3.2. In addition, it is understood that CV≤10% is satisfied, indicating higher performance, when 2.0≤R/r≤2.8.

Overall, it is understood from the above that the highest performance is obtained when 100 μm≤2R≤140 μm, that is, 2.0≤R/r≤2.8.

(F) Fifth Embodiment

<Generalization of Technique of Present Disclosure>

A fifth embodiment generalizes features of a configuration of a capillary array of the present disclosure in which analysis capillaries and lens capillaries are alternately arranged. Here, numbers of the analysis capillaries and the lens capillaries are not necessarily the same. When using analysis capillaries at both ends of the capillary array, N analysis capillaries and N−1 lens capillaries may be alternately arranged, where N is an integer of 2 or more. When using lens capillaries at both ends of the capillary array, N analysis capillaries and N+1 lens capillaries may be alternately arranged. Hereinafter, the term "capillary" indicates both "analysis capillary" and "lens capillary". In a laser-irradiation portion of each capillary, an outer radius of the capillary is defined as R (an outer diameter is 2R), an inner radius is defined as r (an inner diameter is 2r), a refractive index of a medium of an outside of the capillary is defined as $n_1$, a refractive index of a material of the capillary is defined as $n_2$, a refractive index of a medium (separation medium) of an inside of each analysis capillary is defined as $n_3$, and a refractive index of a medium of an inside of each lens capillary is defined as $n_4$. A refraction angle when a laser beam is transmitted through one analysis capillary is defined as $\theta_A$. And a refraction angle when the laser beam is transmitted through one lens capillary is defined as $\theta_B$. The following Formula (5) derived from Formula (1) expresses a refraction angle when the laser beam is transmitted through one set of one analysis capillary and one lens capillary.

[Mathematical Formula 5]

$$\Delta\theta_A + \Delta\theta_B = 2 \cdot \left\{ -2 \cdot \sin^{-1}\left(\frac{r}{2 \cdot R}\right) + 2 \cdot \sin^{-1}\left(\frac{r \cdot n_1}{2 \cdot R \cdot n_2}\right) - 2 \cdot \sin^{-1}\left(\frac{n_1}{2 \cdot n_2}\right) + \sin^{-1}\left(\frac{n_1}{2 \cdot n_3}\right) + \sin^{-1}\left(\frac{n_1}{2 \cdot n_4}\right) \right\} \quad (5)$$

As has been clarified in the second to fourth embodiments so far, in the configuration of the technique of the present disclosure, the condition for the multiple laser-beam focusing to function is given as $\Delta\theta_A + \Delta\theta_B \leq 0$. This condition is found for the first time in the technique of the present disclosure. In particular, in a case where the insides of analysis capillaries are filled with a separation medium having a low refractive index, specifically, under the conditions of $n_3 \leq 1.36$, ideally, $n_3 \leq 1.35$, more ideally, $n_3 \leq 1.34$, and ultimately, $n_3 = 1.33$, it is necessary that $\Delta\theta_A + \Delta\theta_B \leq 0$ is satisfied. These are not realized in any of the known examples. Furthermore, in order to reduce a reflection loss of a laser beam on a lens capillary, a condition of $n_2 = n_4$ is preferable. In this case, Formula (5) is modified into the following Formula (6).

[Mathematical Formula 6]

$$\Delta\theta_A + \Delta\theta_B = 2 \cdot \left\{ -2 \cdot \sin^{-1}\left(\frac{r}{2 \cdot R}\right) + 2 \cdot \sin^{-1}\left(\frac{r \cdot n_1}{2 \cdot R \cdot n_2}\right) - \sin^{-1}\left(\frac{n_1}{2 \cdot n_2}\right) + \sin^{-1}\left(\frac{n_1}{2 \cdot n_3}\right) \right\} \tag{6}$$

The refraction angle when a rod lens having a refractive index of $n_2$ is used instead of the lens capillary is also expressed by Formula (6).

<Ratio of Analysis Capillaries and Lens Capillaries>

Hereinbefore, the analysis capillaries and the lens capillaries were alternately arranged at a ratio of 1:1, but the ratio is not necessarily 1:1. For example, when one lens capillary is used for two analysis capillaries, it is sufficient that the convex lens effect is exhibited as a whole and the multiple laser-beam focusing functions. In this case, the capillaries may be arranged so that one set of two analysis capillaries and one lens capillary is a unit and so that a plurality of units are repeated. It is not necessary that the units are repeated over the entire capillary array. The units may be repeated in a part of the capillary array. In general, when, defining m as a positive integer, one lens capillary is used for m analysis capillaries, that is, when one set of m analysis capillaries and one lens capillary is a unit, it is necessary that $m \cdot \Delta\theta_A + \Delta\theta_B \leq 0$ is satisfied as the following Formula (7), in order for the convex lens effect to be exhibited and the multiple laser-beam focusing to function.

[Mathematical Formula 7]

$$m \cdot \Delta\theta_A + \Delta\theta_B = 2 \cdot \left\{ -(m+1) \cdot \sin^{-1}\left(\frac{\gamma}{2 \cdot B}\right) + (m+1) \cdot \sin^{-1}\left(\frac{\gamma \cdot n_1}{2 \cdot R \cdot n_1}\right) - (m+1) \cdot \sin^{-1}\left(\frac{n_3}{2 \cdot n_2}\right) + m \cdot \sin^{-1}\left(\frac{n_3}{2 \cdot n_3}\right) + \sin^{-1}\left(\frac{n_1}{2 \cdot n_4}\right) \right\} \tag{7}$$

In the case of m=1, Formula (7) is the same as Formula (5).

On the other hand, as has been clarified in the embodiments so far, simultaneous irradiation of all the analysis capillaries with the laser beam becomes difficult when the reflection loss of the laser beam on the capillary is great, even in a case where the multiple laser-beam focusing functions. In a case where a transmittance when a laser beam is transmitted through one analysis capillary is defined as $T_A$, and a transmittance when the laser beam is transmitted through one lens capillary is defined as $T_3$, a transmittance when the laser beam is transmitted through one set of one analysis capillary and one lens capillary is expressed by the following Formula (8) derived from Formula (2)

[Mathematical Formula 8]

$$T_A \times T_B = \left\{1 - \left(\frac{n_1 - n_2}{n_1 + n_2}\right)^2\right\}^4 \cdot \left\{1 - \left(\frac{n_2 - n_3}{n_2 + n_3}\right)^2\right\}^2 \cdot \left\{1 - \left(\frac{n_2 - n_4}{n_2 + n_4}\right)^2\right\}^2 \tag{8}$$

Furthermore, in order to reduce a reflection loss of a laser beam on a lens capillary, a condition of $n_2 = n_4$ is preferable. In this case, Formula (8) is modified into the following Formula (9).

[Mathematical Formula 9]

$$T_A \times T_B = \left\{1 - \left(\frac{n_1 - n_2}{n_1 + n_2}\right)^2\right\}^4 \cdot \left\{1 - \left(\frac{n_2 - n_3}{n_2 + n_3}\right)^2\right\}^4 \tag{9}$$

The transmittance is also expressed by Formula (9) in a case where a rod lens having a refractive index of $n_2$ is used instead of the lens capillary.

In a capillary array in which N analysis capillaries and N lens capillaries are alternately arranged with the both-side irradiation with a laser beam, laser-irradiation intensity at the analysis capillary located at the center of the capillary array is minimal. The capillary number of the analysis capillary located at the center of the capillary array is $n=(N+1)/2$ when N is an odd number, and $n=N/2$ or $n=N/2+1$ when N is an even number. Therefore, the minimum value of the laser-irradiation intensity is expressed by the following Formula (10) derived from Formula (4) when N is an odd number.

[Mathematical Formula 10]

$$\text{MIN} = (T_A \times T_B)^{\frac{N-1}{2}} \tag{10}$$

Alternatively, the minimum value of the laser-irradiation intensity is expressed by the following Formula (11) when N is an even number.

[Mathematical Formula 11]

$$\text{MIN} = (T_A \times T_B)^{\frac{N}{2} - 1} \tag{11}$$

In order to satisfy the practical performance, it is necessary that $\text{MIN} \geq 0.2$ is satisfied using Formula (10) or Formula (11). In particular, in order to realize the simultaneous irradiation of 24 or more, and 48 or more analysis capillaries with a laser beam, it is necessary that $\text{MIN} \geq 0.2$ is satisfied under the conditions of N=24 and N=48. When N=48 in Formula (11), it is only required that $T_A \times T_B \geq 93\%$ is satisfied in order to satisfy $\text{MIN} \geq 0.2$. These conditions are found for the first time in the present disclosure. In particular, when the insides of the analysis capillaries are filled with a separation medium having a low refractive index, it is necessary that $\text{MIN} \geq 0.2$ is satisfied under the condition of, specifically, $n_3 \leq 1.36$, ideally, $n_3 \leq 1.35$, more ideally, $n_3 \leq 1.34$, and ultimately, $n_3 = 1.33$.

It is possible to approximately obtain the coefficient of variation CV of the laser-irradiation intensities at the N analysis capillaries from Formula (4). The maximum value MAX of the laser-irradiation intensity is obtained at the capillaries located at both ends of the capillary array (n=1 and n=N). The minimum value MIN of the laser-irradiation intensity is obtained at the capillary located at the center of the capillary array ($n=(N+1)/2$ when N is an odd number, and $n=N/2$ or $n=N/2+1$ when N is an even number). MAX is expressed by the following Formula (12) derived from Formula (4) regardless of whether N is an odd number or an even number.

[Mathematical Formula 12]

$$MAX = 0.5 \cdot \{(T_A \times T_B)^{N-1} + 1\} \quad (12)$$

In this case, CV can be approximated by dividing the value of MAX−MIN by the average value of MAX and MIN, and then by 3. That is, CV is expressed by the following Formula (13).

[Mathematical Formula 13]

$$CV = \frac{2 \cdot (MAX - MIN)}{3 \cdot (MAX + MIN)} \quad (13)$$

In order to satisfy the practical performances, it is necessary that CV≤20% and CV≤15% are satisfied using Formula (10) or (11), Formula (12), and Formula (13).

As described above, in order to obtain higher practical performance, it is necessary that the three conditions, (i) $\Delta\theta_A + \Delta\theta_B \leq 0$ or $m \cdot \Delta\theta_A + \Delta\theta_B \leq 0$, (ii) MIN≥0.2, and (iii) CV≤20% or CV≤15%, are satisfied at the same time for efficient simultaneous irradiation of a plurality of analysis capillaries with a laser beam. In particular, when the insides of the analysis capillaries are filled with a separation medium having a low refractive index, under the condition of, specifically, $n_3 \leq 1.36$, ideally, $n_3 \leq 1.35$, more ideally, $n_3 \leq 1.34$, and ultimately, $n_3 = 1.33$, it is necessary that all of these conditions are satisfied at the same time.

(G) Sixth Embodiment

A sixth embodiment presents a specific configuration of a capillary array in which analysis capillaries and lens capillaries are alternately arranged. Hereinafter, the term "capillary" indicates both "analysis capillary" and "lens capillary".

Figure 23:
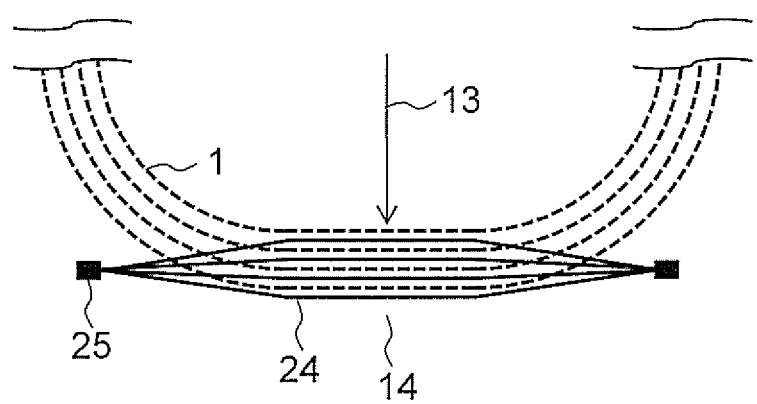
FIG. 23 is a diagram illustrating a configuration example of a capillary array in which analysis capillaries and lens capillaries are alternately arranged.

FIG. 23 is a diagram illustrating a surrounding of laser-irradiation portions 14 of a plurality of capillaries in a capillary array. The capillary array is configured by alternately arranging the laser-irradiation portions 14 of a plurality of analysis capillaries 1 and a plurality of lens capillaries 24 on the array plane. The analysis capillaries 1 are indicated by the dotted lines. The lens capillaries 24 are indicated by the solid lines. The laser beam 13 is incident from the side of the array plane and is simultaneously irradiated to the laser-irradiation portion 14 of each capillary.

FIG. 23 depicts only the vicinity of the laser-irradiation portions 14 of the analysis capillaries 1, whereas the lens capillaries 24 are entirely depicted in the drawing. In other words, the entire length of the lens capillaries is shorter than the entire length of the analysis capillaries. The reason why the lens capillaries are shorter is that it is sufficient if the laser-irradiation portions 14 of the lens capillaries exists. As a result, it is possible to reduce the amount of the capillaries consumed as well as to simplify the capillary array. The insides of the lens capillaries are filled with a medium having a high refractive index. For example, when the material of the capillaries is quartz glass having a refractive index $n_2 = 1.46$, the insides of the lens capillaries are preferably filled with a matching solution having a refractive index $n_4 = 1.46$. It is also effective to seal both ends of the lens capillaries so that the solution filling the lens capillaries does not escape from the lens capillaries due to evaporation or the like. Furthermore, as shown in FIG. 23, both ends of a plurality of lens capillaries are preferably bundled and sealed together using sealing portions 25. As a result, the entire capillary array can be further simplified. For binding the sealing portion 25 with the lens capillaries, it is convenient to use an adhesive.

Although the case of using quartz glass capillaries having a refractive index $n_2 = 1.46$ for both the analysis capillaries and the lens capillaries has been described above, a quartz glass rod may be used instead of the lens capillary, and the glass rod and the analysis capillary may have equal outer diameters. The entire length of the quartz glass rod can be shorter than the entire length of the analysis capillary in this case as well.

REFERENCE SIGNS LIST 1 capillary (analysis capillary)
2 sample-injection end
3 sample-elution end
4 cathode
5 anode
6 cathode-side buffer solution
7 anode-side buffer solution
8 power source
9 polymer block
10 valve
11 syringe
12 laser source
13 laser beam
14 laser-irradiation portion
15 condenser lens
16 laser-cut filter
17 transmission grating
18 imaging lens
19 sensor
20 emission point
21 fluorescence
22 imaging point
23 optical axis
24 lens capillary
25 sealing portion

The invention claimed is:

1. A capillary array comprising:
laser-irradiation portions of N analysis capillaries used for electrophoretic analysis,
laser-irradiation portions of N±1 lens capillaries not used for the electrophoretic analysis,
wherein the N analysis capillaries and the N±1 lens capillaries in the laser-irradiation portions are alternately arranged approximately on a same array plane and collectively irradiated with a laser beam,
wherein N is an integer of 2 or more,
and
wherein, when an outer radius, an inner radius, a refractive index of a medium of an outside, and a refractive index of a material of each of the N analysis capillaries and the N±1 lens capillaries in the laser-irradiation portion are respectively defined as R, r, $n_1$, and $n_2$, a refractive index of a medium of an inside of each of the N analysis capillaries in the laser-irradiation portions is defined as $n_3$, and a refractive index of a medium of an inside of each of the N±1 lens capillaries in the laser-irradiation portions is defined as $n_4$, and wherein $n_3 \leq 1.36$ is satisfied, R, r, $n_1$, $n_2$, $n_3$ and $n_4$ satisfy the following,

[Mathematical Formula 1]

$$-2 \cdot \sin^{-1}\left(\frac{r}{2 \cdot R}\right) + 2 \cdot \sin^{-1}\left(\frac{r \cdot n_1}{2 \cdot R \cdot n_2}\right) - 2 \cdot \sin^{-1}\left(\frac{n_1}{2 \cdot n_2}\right) + \sin^{-1}\left(\frac{n_1}{2 \cdot n_3}\right) + \sin^{-1}\left(\frac{n_1}{2 \cdot n_4}\right) \leq 0.$$

2. The capillary array according to claim 1, wherein $n_3 \leq 1.34$ is satisfied.

3. The capillary array according to claim 1, wherein, when a transmittance of each of the N analysis capillaries is defined as $T_A$, a transmittance of each of the N±1 lens capillaries is defined as $T_B$, and $T_A \times T_B$ is expressed by the following formula,

[Mathematical Formula 2]

$$T_A \times T_B = \left\{1 - \left(\frac{n_1 - n_2}{n_1 + n_2}\right)^2\right\}^4 \cdot \left\{1 - \left(\frac{n_2 - n_3}{n_2 + n_3}\right)^2\right\}^4$$

wherein, when N is an odd number, the following relationship is satisfied,

[Mathematical Formula 3]

$$(T_A \times T_B)^{\frac{N-1}{2}} \geq 0.2$$

and when N is an even number, the following relationship is satisfied,

[Mathematical Formula 4]

$$(T_A \times T_B)^{\frac{N}{2}-1} \geq 0.2.$$

4. The capillary array according to claim 1, wherein, when a transmittance of each of the N analysis capillaries is defined as $T_A$, a transmittance of each of the N±1 lens capillaries is defined as $T_B$, $T_A \times T_B$ is expressed by the following formula,

[Mathematical Formula 5]

$$T_A \times T_B = \left\{1 - \left(\frac{n_1 - n_2}{n_1 + n_2}\right)^2\right\}^4 \cdot \left\{1 - \left(\frac{n_2 - n_3}{n_2 + n_3}\right)^2\right\}^4$$

MAX is expressed by the following formula, $$\text{MAX} = 0.5 \cdot \{(T_A \times T_B)^{N-1} + 1\} \qquad \text{[Mathematical Formula 6]}$$

MIN is expressed by the following formula when N is an odd number,

[Mathematical Formula 7]

$$\text{MIN} = (T_A \times T_B)^{\frac{N-1}{2}}$$

or by the following formula when N is an even number,

[Mathematical Formula 8]

$$\text{MIN} = (T_A \times T_B)^{\frac{N}{2}-1}$$

the following relationship is satisfied,

[Mathematical Formula 9]

$$\frac{2 \cdot (\text{MAX} - \text{MIN})}{3 \cdot (\text{MAX} + \text{MIN})} \leq 20\%.$$

5. The capillary array according to claim 4, wherein the following relationship is satisfied,

[Mathematical Formula 10]

$$\frac{2 \cdot (\text{MAX} - \text{MIN})}{3 \cdot (\text{MAX} + \text{MIN})} \leq 15\%.$$

6. The capillary array according to claim 1, wherein $1.23 \leq n_1 \leq 1.29$ is satisfied.

7. The capillary array according to claim 6, wherein $1.24 \leq n_1 \leq 1.28$ is satisfied.

8. The capillary array according to claim 1, wherein $1.8 \leq R/r \leq 3.0$ is satisfied.

9. The capillary array according to claim 8, wherein $2.0 \leq R/r \leq 2.8$ is satisfied.

10. The capillary array according to claim 1, wherein $n_2 = n_4 = 1.46 \pm 0.01$ is satisfied.

11. The capillary array according to claim 1, wherein $1.33 \leq n_3 \leq 1.36$ is satisfied.

12. The capillary array according to claim 1, wherein the capillary array has a plurality of analysis modes including a first analysis mode in which $1.33 \leq n_3 \leq 1.36$ is satisfied and a second analysis mode in which $1.36 \leq n_3 \leq 1.42$ is satisfied.

13. The capillary array according to claim 1, wherein $N \geq 48$ is satisfied.

14. A capillary array comprising:
laser-irradiation portions of N analysis capillaries used for electrophoretic analysis,
laser-irradiation portions of N±1 lens capillaries not used in the electrophoretic analysis,
wherein the N analysis capillaries and the N±1 lens capillaries in the laser-irradiation portions are alternately arranged approximately on a same array plane and collectively irradiated with a laser beam,
wherein N is an integer of 2 or more, and
wherein, when an outer radius, an inner radius, a refractive index of a medium of an outside, and a refractive index of a material of each of the N analysis capillaries and the N±1 les capillaries in the laser-irradiation portions are respectively defined as R, r, $n_1$, and $n_2$, a refractive index of a medium of an inside of each of the N analysis capillaries in the laser-irradiation portions is defined as $n_3$, and a refractive index of a medium of an inside of each of the N±1 lens capillaries in the laser-irradiation portions is defined as $n_4$, the relationships $1.23 \leq n_1 \leq 1.29$, $n_2 = n_4 = 1.46 \pm 0.01$, $1.33 \leq n_3 \leq 1.36$, and $R/r \leq 3.5$ are satisfied.

15. The capillary array according to claim 14, wherein $1.24 \leq n_1 \leq 1.28$ is satisfied.

16. The capillary array according to claim 14, wherein $2.0 \leq R/r \leq 2.8$ is satisfied.

17. The capillary array according to claim 14, wherein $N \geq 48$ is satisfied.

18. A capillary array comprising:
laser-irradiation portions of N analysis capillaries used for electrophoretic analysis,
laser-irradiation portions of N±1 lens capillaries not used for the electrophoretic analysis,
wherein the N analysis capillaries and the N±1 lens capillaries in the laser-irradiation portions are alternately arranged approximately on a same array plane and collectively irradiated with a laser beam,
wherein N is an integer of 2 or more,
wherein, when an outer radius, an inner radius, a refractive index of a medium of an outside, and a refractive index of a material of each of the N analysis capillaries and the N±1 lens capillaries in the laser-irradiation portions are respectively defined as R, r, $n_1$, and $n_2$, a refractive index of a medium of an inside of each of the N analysis capillaries in the laser-irradiation portions and the N±1 lens capillaries in the laser-irradiation portions, a refractive index of a medium on an inside of the N analysis capillaries in the laser-irradiation portions is defined as $n_3$, and a refractive index of a medium on an inside of the N±1 lens capillaries in the laser-irradiation portions is defined as $n_4$, the capillary array has a plurality of analysis modes including a first analysis mode in which $1.33 \leq n_3 \leq 1.36$ is satisfied and a second analysis mode in which $1.36 \leq n_3 \leq 1.42$ is satisfied, under the conditions where $1.23 \leq n_1 \leq 1.29$, $n_2 = n_4 = 1.46 \pm 0.01$, and $R/r \leq 3.5$ are satisfied.

19. The capillary array according to claim 18, wherein $1.24 \leq n_1 \leq 1.28$ is satisfied.

20. The capillary array according to claim 18, wherein $2.0 \leq R/r \leq 2.8$ is satisfied.

21. The capillary array according to claim 18, wherein N 48 is satisfied.

22. A capillary array comprising:
laser-irradiation portions of N analysis capillaries used for electrophoretic analysis,
laser-irradiation portions of N±1 lens capillaries not used for the electrophoretic analysis,
wherein the N analysis capillaries and the N±1 lens capillaries in the laser-irradiation portions are alternately arranged approximately on a same array plane and collectively irradiated with a laser beam,
wherein N is an integer of 2 or more,
wherein a length of the N analysis capillaries is longer than a length of the N±1 lens capillaries.

* * * * *